United States Patent [19]

Owen et al.

[11] Patent Number: 4,876,660
[45] Date of Patent: Oct. 24, 1989

[54] FIXED-POINT MULTIPLIER-ACCUMULATOR ARCHITECTURE

[75] Inventors: Robert E. Owen, Saratoga, Calif.; Bruce E. Miller, Aloha, Oreg.

[73] Assignee: Bipolar Integrated Technology, Inc., Beaverton, Oreg.

[21] Appl. No.: 34,829

[22] Filed: Apr. 6, 1987

Related U.S. Application Data

[63] Continuation-in-part of Ser. No. 28,360, Mar. 20, 1987.

[51] Int. Cl.$^4$ .............................................. G06F 7/52
[52] U.S. Cl. .................................................. 364/754
[58] Field of Search ........................ 364/754, 757–760, 364/736, 745, 726

[56] References Cited

U.S. PATENT DOCUMENTS

| | | | |
|---|---|---|---|
| 4,215,416 | 7/1980 | Muramatsu | 364/736 |
| 4,546,446 | 10/1985 | Machida | 364/757 |
| 4,700,324 | 10/1987 | Dol et al. | 364/745 |

OTHER PUBLICATIONS

Downing, P. et al., "Denser Process Gets the Most Out of Bipolar VLSI," Electronics, pp. 131–133, Jun. 28, 1984.
"A Bipolar Process That's Repelling CMOS," Electronics, pp. 45–47, Dec. 23, 1985.
"Surprise! ECL Runs on Only Microwatts," Electronics, pp. 35–38, Apr. 7, 1986.
Wilson, G., "Creating Low-Power Bipolar ECL at VLSI Densities," VLSI Systems Design, pp. 84–86, May, 1986.

Analog Devices, ADSP-1101 Enhanced Multiplier-/Accumulator, Sep. 1984.
TRW, Inc., TMC2010 CMOS Multiplier-Accumulator, Nov. 1983.

Primary Examiner—Gary V. Harkcom
Assistant Examiner—Long Thonk Nguyen
Attorney, Agent, or Firm—Marger & Johnson

[57] ABSTRACT

An integrated circuit multiplier-accumulator architecture includes an M-bit wide register for inputting an X operand and an N-bit wide input register for inputting a Y operand to a multiplier. The multiplier can selectably multiply or concatenate the operands to produce a binary product in the form of a first array of M+N parallel bits. A binary adder adds the binary product to a second array of M+N+P+1 parallel bits and outputs the sum as a Z result in the form of a third array of M+N+P+1 parallel bits. The Z result is stored in a selected one of two accumulators. A feedback path is provided to output selected accumulator contents to the adder as the second binary array of M+N+P+1 bits. Output ports are provided for outputting a selected portion of the accumulator contents. Preferably, the output ports can output the entire M+N+P bits in parallel, as well as any selected portion thereof. Overflow logic can be provided which determines from the (M+n+P+1)th bit whether an overflow has occurred in the M+N+P bit result. A format adjust circuit is provided between the accumulators and the output ports for shifting the entire output accumulator contents a predetermined number of bits within a range of zero to at least P bits, and preferably P+1 bits, in the direction of the most significant bit.

33 Claims, 16 Drawing Sheets

FIG. 1a

| OPERATION* | | I3 | I2 | I1 | I0 |
|---|---|---|---|---|---|
| Load Product | Z = X·Y | 0 | 0 | 0 | 0 |
| Load Input | Z = X\|Y | 0 | 0 | 0 | 1 |
| Load Minus Product | Z = – X·Y | 0 | 0 | 1 | 0 |
| Load Minus Input | Z = – X\|Y | 0 | 0 | 1 | 1 |
| ACC Plus Product | Z = Z + X·Y | 0 | 1 | 0 | 0 |
| ACC Plus Input | Z = Z + X\|Y | 0 | 1 | 0 | 1 |
| ACC Minus Product | Z = Z – X·Y | 0 | 1 | 1 | 0 |
| ACC Minus Input | Z = Z – X\|Y | 0 | 1 | 1 | 1 |
| Product Minus ACC | Z = X·Y – Z | 1 | 0 | 0 | 0 |
| Input Minus ACC | Z = X\|Y – Z | 1 | 0 | 0 | 1 |
| Shifted ACC Plus Product | $Z = Z \cdot 2^{-16} + X \cdot Y$ | 1 | 0 | 1 | 0 |
| Shifted ACC Plus Input | $Z = Z \cdot 2^{-16} + X\|Y$ | 1 | 0 | 1 | 1 |
| Load ACC | Z = Z | 1 | 1 | 0 | 0 |
| Load Input Extended | Z = X'\|Z' | 1 | 1 | 0 | 1 |
| Load Shifted ACC | $Z = Z \cdot 2^{-16}$ | 1 | 1 | 1 | 0 |
| Load Zero | Z = 0 | 1 | 1 | 1 | 1 |

| SOURCE | | I6 YA/B | I5 XA/B | I4 ZA/B |
|---|---|---|---|---|
| Source Accumulator ZA | Z = ZA | X | X | 0 |
| Source Accumulator ZB | Z = ZB | X | X | 1 |
| X Operand XA | X = XA | X | 0 | X |
| X Operand XB | X = XB | X | 1 | X |
| Y Operand YA | Y = YA | 0 | X | X |
| Y Operand YB | Y = YB | 1 | X | X |

| ROUND | I8 | I7 |
|---|---|---|
| No rounding | 0 | 0 |
| MS rounding | 0 | 1 |
| LS rounding | 1 | 0 |

| MODE | I10 YM | I9 XM |
|---|---|---|
| X Operand unsigned | X | 0 |
| X Operand signed | X | 1 |
| Y Operand unsigned | 0 | X |
| Y Operand signed | 1 | X |

*Note:
X|Y is X concatenated with Y.
Z' is the least significant 32-bits of the accumulator.
X' is the most significant 8-bits of the X operand.

FIG. 1b

| LEFT SHIFT | FA3 | FA2 | FA1 | FA0 | MODE | FA5 | FA4 |
|---|---|---|---|---|---|---|---|
| 0 | 0 | 0 | 0 | 0 | Unsigned | X | 0 |
| 1 | 0 | 0 | 0 | 1 | Signed | X | 1 |
| 2 | 0 | 0 | 1 | 0 | OVERFLOW | | |
| 3 | 0 | 0 | 1 | 1 | | | |
| 4 | 0 | 1 | 0 | 0 | Uncorrected | 0 | X |
| 5 | 0 | 1 | 0 | 1 | Corrected | 1 | X |
| 6 | 0 | 1 | 1 | 0 | | | |
| 7 | 0 | 1 | 1 | 1 | | | |
| 8 | 1 | 0 | 0 | 0 | | | |
| 9 | 1 | 0 | 0 | 1 | | | |

FIG. 1c

| OUTPUT | TSEL 2 | TSEL 1 | TSEL 0 |
|---|---|---|---|
| WMS | X | 0 | 0 |
| WLS | X | 0 | 1 |
| WX | X | 1 | 0 |
| Status flags | X | 1 | 1 |
| Accumulator ZA | 0 | X | X |
| Accumulator ZB | 1 | X | X |

FIG.3

LOAD PRODUCT   X·Y = P

UNSIGNED (XM, YM = 0)

| $z_{40}$ | $z_{39}$ ............ | $z_{32}$ | $z_{31}$ ............ | $z_{24}$ | $z_{23}$ ............ | $z_{16}$ | $z_{15}$ ............ | $z_8$ | $z_7$ ............ | $z_0$ |   Z RESULT

| 0 | 0 0 0 0 0 0 0 0 | $P_{31}$ ............ | $P_{24}$ | $P_{23}$ ............ | $P_{16}$ | $P_{15}$ ............ | $P_8$ | $P_7$ ............ | $P_0$ |

UNSIGNED FRACTIONAL $2^8$ $2^7$ ............ $2^0$ $2^{-1}$ ............ $2^{-8}$ $2^{-9}$ ............ $2^{-16}$ $2^{-17}$ ............ $2^{-24}$ $2^{-25}$ ............ $2^{-32}$   Value
    BINARY POINT MIXED MODE OR SIGNED (XM = YM = 1 or XM ≠ YM)

$P_{31}$ ............ $P_{24}$ $P_{23}$ ............ $P_{16}$ $P_{15}$ ............ $P_8$ $P_7$ ............ $P_0$

MIXED MODE FRACTIONAL $2^9$ $2^8$ ............ $2^1$ $2^0$ $2^{-1}$ ............ $2^{-7}$ $2^{-8}$ ............ $2^{-15}$ $2^{-16}$ ............ $2^{-23}$ $2^{-24}$ ............ $2^{-31}$   Value
    BINARY POINT

SIGNED FRACTIONAL $2^{10}$ $2^9$ ............ $2^2$ $2^1$ $2^0$ $2^{-1}$ ............ $2^{-6}$ $2^{-7}$ ............ $2^{-14}$ $2^{-15}$ ............ $2^{-22}$ $2^{-23}$ ............ $2^{-30}$   Value
    BINARY POINT

LOAD INPUT $Z = X|Y$
SIGNED AND UNSIGNED

| ZEROS OR SIGN EXTENSION | $X_{15}$ ...... $X_8$ | $X_7$ ...... $X_0$ | $Y_{15}$ ...... $Y_8$ | $Y_7$ ...... $Y_0$ |

LOAD INPUT EXTENDED $Z = X'|Z'$

| Z.S | $X_7 X_6 X_5 X_4 X_3 X_2 X_1 X_0$ | $Z_{31}$ ...... $Z_{24}$ | $Z_{23}$ ...... $Z_{16}$ | $Z_{15}$ ...... $Z_8$ | $Z_7$ ...... $Z_0$ |

LOAD ACCUMULATOR $Z = Z$

| Z.S | $Z_{39}$ ...... $Z_{32}$ | $Z_{31}$ ...... $Z_{24}$ | $Z_{23}$ ...... $Z_{16}$ | $Z_{15}$ ...... $Z_8$ | $Z_7$ ...... $Z_0$ |

LOAD SHIFTED ACCUMULATOR $Z = Z \cdot 2^{-16}$
SIGNED AND UNSIGNED

| ZEROS OR SIGN EXTENSION | $Z_{39}$ ...... $Z_{32}$ | $Z_{31}$ ...... $Z_{24}$ | $Z_{23}$ ...... $Z_{16}$ |

LOAD ZERO

| 0 0 0 0 0 0 0 0 | 0 0 0 0 0 0 0 0 | 0 0 0 0 0 0 0 0 | 0 0 0 0 0 0 0 0 | 0 0 0 0 0 0 0 0 |

REGISTER ENABLES

CK1, CK2

$\overline{XEN}$, $\overline{YEN}$, $\overline{ZEN}$

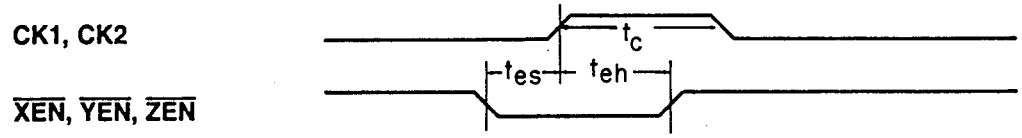

OUTPUT ENABLES (ECL)

$\overline{TME}$, $\overline{TLE}$, $\overline{TXE}$

TMS, TLS, TX

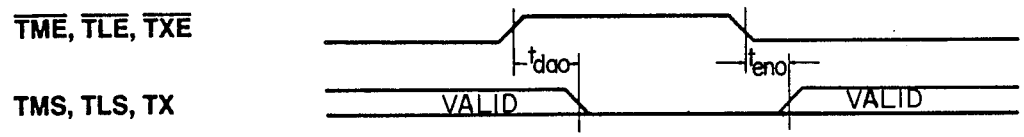

OUTPUT ENABLES (TTL)

$\overline{TME}$, $\overline{TLE}$, $\overline{TXE}$

TMS, TLS, TX

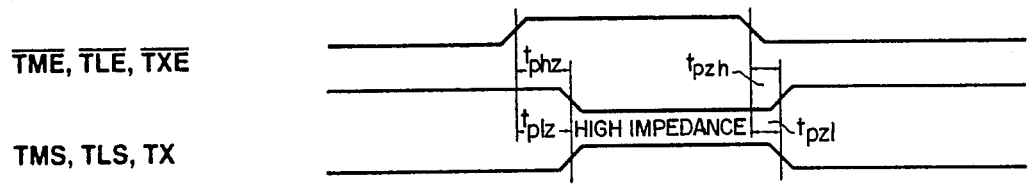

$\overline{XEN}$ IS $\overline{XAEN}$ OR $\overline{XBEN}$; $\overline{ZEN}$ IS $\overline{ZAEN}$ OR $\overline{ZBEN}$ $\overline{YEN}$ IS $\overline{YAEN}$ OR $\overline{YBEN}$; $\overline{TME}$ = $\overline{TLE}$ = $\overline{TXE}$ = 0

*Single Clock, Input Registers Bypassed*

*Dual Clock, Input Registers Clocked*

Unclocked Controls

Clocked Controls

FIG. 10
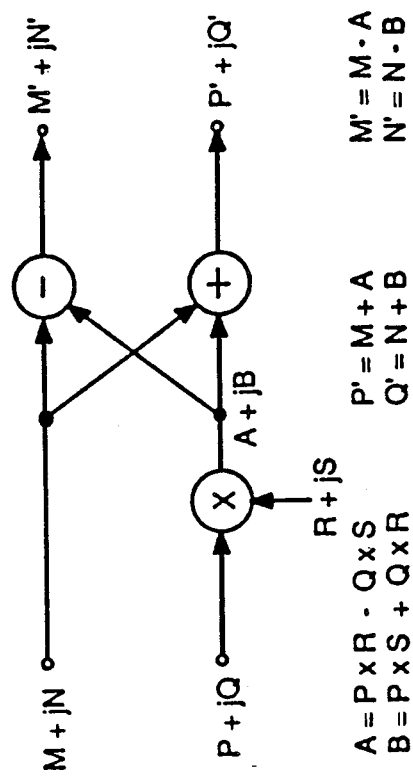
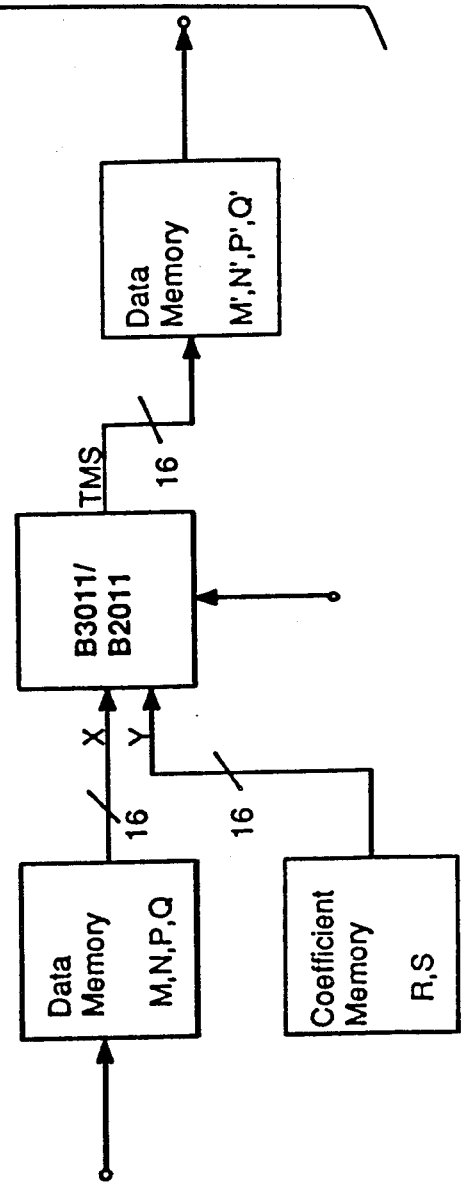

FIG.11
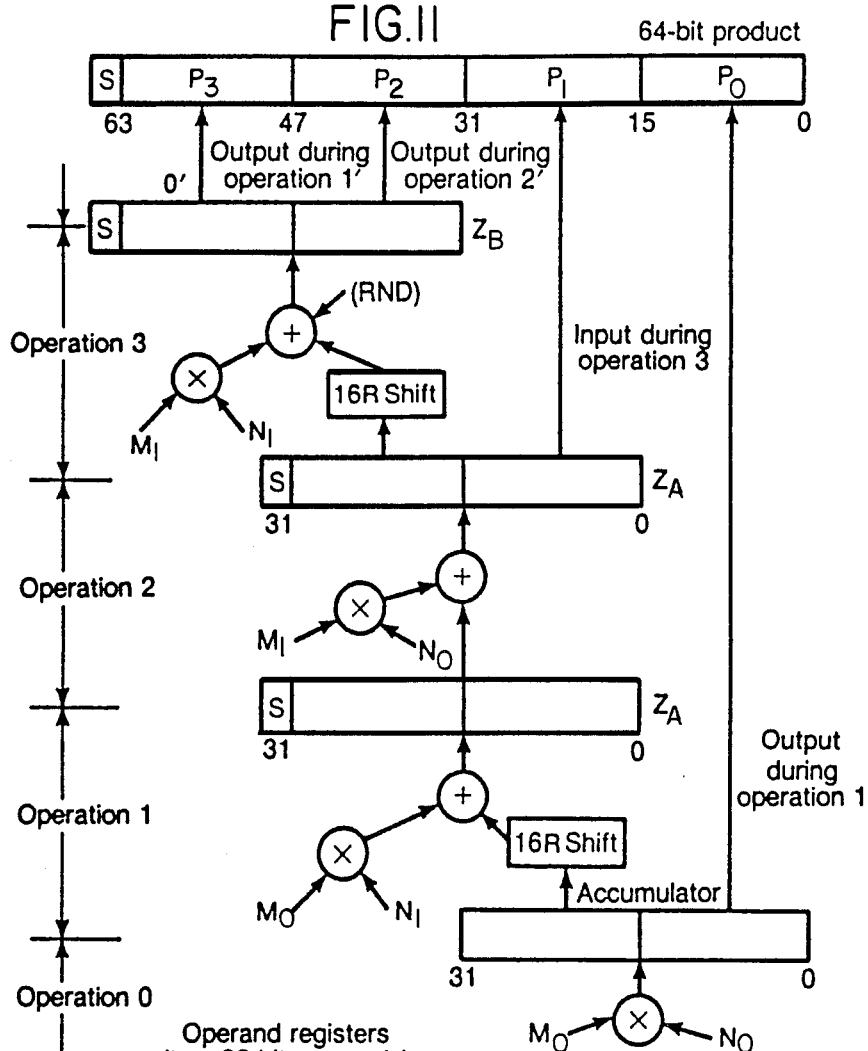
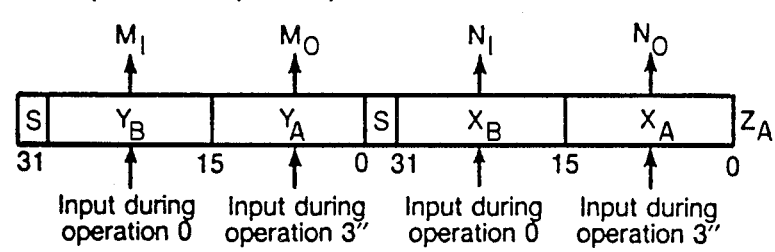
(a)
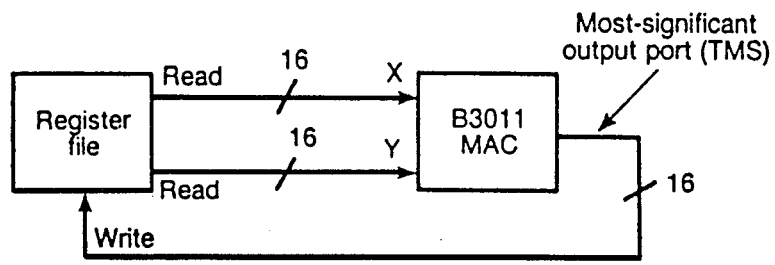
(b)

FIXED-POINT MULTIPLIER-ACCUMULATOR ARCHITECTURE

BACKGROUND OF THE INVENTION

This is a continuation-in-part of our patent application Ser. No. 07/028,360 filed Mar. 20, 1987, entitled HIGH-SPEED DIGITAL MULTIPLIER ARCHITECTURE.

This invention relates generally to digital multiplier-accumulators, and more particularly to highspeed, large scale integrated circuit (VLSI) multiplier-accumulators for digital signal processing and general data processing applications.

Digital multiplier-accumulators are one of the basic building blocks in digital signal and data processing systems. Conventional multiplier-accumulator architectures are generally very similar. An example of a multiplier accumulator architecture in common use is a TRW Inc. TMC2010 $16 \times 16$ bit multiplier-accumulator. The most advanced design known to be available is the Analog Devices, Inc. ADSP-1101 $16 \times 16$ enhanced multiplier accumulator. Both of these designs, and other available $16 \times 16$ devices, are built in LSI to VLSI-scale CMOS technologies. The TMC2010 operates at a 160 ns. cycle time. TRW also makes a bipolar TTL $16 \times 16$ bit multiplier-accumulator, the TCD1010. The TDC1010 is functionally compatible with the TMC2010 but operates at about 80 ns. The more advanced ADSP-1101 supports a 60 ns. cycle time.

A typical multiplier-accumulator architecture has $2^n$ parallel inputs for an X operand and $2^n$-bit parallel inputs for a Y operand. The operands can be in either integer or fractional unsigned format or in integer or fractional two's complement format. The ADSP-1101 additionally permits mixed-mode and floating point arithmetic. The inputs are clocked into a $2^n \times 2^n$ multiplier through separate registers under control of clock enable circuitry. The ADSP-1101 provides two registers and a 3:1 multiplexer for each operand. A full clock cycle is required to input the X and Y operands. Conventional multiplication techniques use a modified Booth recoding scheme to generate partial products for the operands by pairs of bits, rather than single bits at a time. A Wallace tree configuration adder, with carry/save adders, is conventionally used to add up the partial products. A carry/lookahead adder is commonly used for adding the final products. The product is a binary number of $2^{n+1}$ parallel bits, which is commonly truncated or rounded to $2^n$ bits for output.

The product is then output to an adder. The adder adds the product to another binary number retrieved from an accumulator and outputs the sum back to the accumulator. Typical multiplier-accumulator architectures have a single accumulator. The more advanced ADSP-1101 multiplier-accumulator has two accumulators. The sum from the adder is input to a selected one of the accumulators through a 2:1 multiplexer. Another multiplexer is used to select from which accumulator the stored contents are to be retrieved and fed back to the adder. The Analog Devices design also includes means for inverting, shifting or passing the multiplier product and accumulator contents before they are input to the adder. The shifting means enable a single bit shift for binary point alignment in fractional arithmetic.

Multiplier-accumulators conventionally make provision for a number of additional bits to be added to the sum in addition to the number of bits input as the product from the multiplier. In a $16 \times 16$ multiplier-accumulator, the product contains thirty-two bits. In the more commonly available multiplier-accumulator designs, such as the TMC2010, three additional bits, for a total of thirty-five bits, are output from the adder to the accumulator. The same number of bits is fed back from the accumulator to the adder. The ADSP-1101 multiplier-accumulator provides for eight additional bits, or a total of forty bits, that are output from the adder to the accumulators and available to be fed back to the adder. To implement the additional three or eight bits, multiplier accumulators are conventionally provided with an extended precision or product register, in addition to a sixteen bit most significant product and sixteen bit least significant product register.

The ADSP-1101 multiplier-accumulator has an overflow detection logic in the adder that is set when the most significant product overflows into the extension register. Each accumulator register is likewise provided with overflow detection logic. The ADSP-1101 outputs such bits directly to overflow status indicators. These overflow flags will not reflect cases where a value overflows solely as a result of output shifting.

The final 40-bit result is output to output circuitry. In the enhanced ADSP-1101 multiplier-accumulator, the accumulator contents are output through a format adjusting shifter. This shifter is selectably operable to left-shift or right-shift the output product by a selected number of bit positions over a range of zero to seven bits. The left-shift truncates the highest order bits in the extended precision register, and the right shift truncates the least significant bits. Saturation logic is provided in the output of the sixteen most significant bits of the ADSP-1101. This logic works in conjunction with the overflow detection flags from the accumulators to conditionally saturate the outputs.

Conventional multiplier-accumulators ordinarily provide separate outputs only for the sixteen most significant bits plus a limited number of extended product bits. The TMC2010 provides for output of all three extended bits. If the least significant sixteen bits are desired to be output, these are output through pins shared with the input for the Y-operand. This wastes one input cycle. The ADSP-1101 provides twenty output pins with an output multiplexer. The most significant sixteen bits and four of the eight extended precision bits are output in a first cycle, followed optionally in a second cycle by the least significant sixteen bits and the remaining four bits of the extended precision register.

Conventional $16 \times 16$ bit multiplier-accumulators incorporate 16-bit rounding. The ADSP-1101 provides for rounding bit insertion at bit positions 14, 15 or 16 of the accumulator contents to track the shift operation at the inputs to the adder. The benefits of rounding are limited, however, when the most significant portion of the product extends into the extended precision register. The contents of both the most significant bit register and the extended register must both be output.

Some prior multiplier-accumulators also provide means for preloading the accumulator with externally-input operands that have not been multiplied. U.S. Pat. No. 4,215,416 to Muramatsu, assigned to TRW, Inc., discloses circuitry for preloading such data into the accumulator from the output terminals. This approach wastes output cycles and necessitates use of tri-state output buffers. The Analog Devices ADSP-1101 multiplier-accumulator has a capability for preloading the accumulators directly, bypassing the multiplier, by inputting a 16-bit word at a time through the Y-operand input port and the accumulator input multiplexers. Two input cycles are required to input 32 bits into an accumulator using this capability.

The foregoing and other characteristics of conventional multiplier-accumulator architectures turn out to be limiting and cumbersome to systems designers seeking to incorporate conventional multiplier-accumulators in signal processing or data processing systems. Accordingly, a need remains for an improved, integrated multiplier-accumulator architecture, particularly for high-speed fixed-point operations.

SUMMARY OF THE INVENTION

We have reassessed the architectural configuration of multiplier-accumulators commonly used in conventional practice, particularly in light of the development of more advanced integrated circuit processes. Several such processes have recently been described in the literature, including: Downing, P., et al., "Denser Process Gets the Most Out of Bipolar VLSI," Electronics, pp. 131-133, June 28, 1984; "A Bipolar Process That's Repelling CMOS," Electronics, p. 45-47, Dec. 23, 1985; "Surprise! ECL Runs on Only Microwatts," Electronics, pp. 35-38, Apr. 7, 1986; and Wilson, G., "Creating Low-Power Bipolar ECL at VLSI Densities," VLSI Systems Design, pp. 84-86, May 1986.

These more advanced processes provide increased speed and device density and lower power dissipation levels, which in turn offer several significant benefits to the system designer and user. First, smaller transistors enable higher density and thereby allow implementation of more complex functions on a chip. Second, with greater density, the system designer can use fewer parts, and power requirements are reduced. As a result, the speed and throughput of the overall system can be increased because the parts interconnection delay can be readily reduced.

Following this reassessment, we designed a 16×16 bit multiplier-accumulator and implemented it in an integrated circuit using the VLSI bipolar process described in the last two articles listed above. This new process allows a full 16-bits of precision with higher speed than current 16-bit multiplier-accumulators. With the multiplier-accumulator architecture described below, total worst-case clocked multiply-accumulate time is 15 ns. This multiplier-accumulator can run at clock speeds of 60 to 80 MHz. This is several times faster than the fastest-known CMOS and bipolar multiplier-accumulators of comparable size.

Taking advantage of the higher speeds and functional densities at bipolar VLSI levels, and using a higher pin-count package than used in prior multipliers, we enhanced the multiplier-accumulator architecture so as to incorporate features that were not possible before. Functionally, these enhancements fall into three categories: increased speed of overall multiplier-accumulator operation; increased accuracy and certainty as to the various states of operation of the multiplier-accumulator; and added capabilities of the multiplier-accumulator. In terms of architectural features, we have incorporated a number of differences in our multiplier-accumulator, over prior multiplier-accumulators, and these differences serve in various combinations in the multiplier-accumulator as a whole, to produce the various functional advantages identified above.

The multiplier-accumulator of the invention is described with reference to a symmetric 16×16 bit multiplier but its principles can readily be generalized to a $2^n \times 2^n$ bit multiplier, for example, a 32×32 bit multiplier. Further, most principles of the invention can be applied to N×M bit multiplier-accumulators, wherein N and M need not be equal or even numbers.

In accordance with a first aspect of the invention, in an integrated circuit a multiplier-accumulator architecture includes first and second data input means for inputting binary X and Y operands, respectively comprising an array of M and N parallel bits. A multiplier multiplies the operands to produce a binary product in the form of a first array of M+N parallel bits. A binary adder means adds the binary product to a second binary array of M+N+P+1 parallel bits and outputs the sum of a Z result in the form of a third array of M+N+P+1 parallel bits. The Z result is stored in an accumulator means as the accumulator contents. A feedback means is selectable to output the accumulator contents to the adder as said second binary array of M+N+P+1 bits. Output means is provided for outputting a selectable portion of the least significant M+N+P bit of the accumulator contents. Preferably, the output means includes means for outputting the entire M+N+P bits in parallel, as well as any selected portion thereof.

The extra bit used in the present invention provides an unambiguous carry or overflow bit that is carried through the multiplier-accumulator and, consequently, is available at the output means for determining various status conditions and controlling saturation. Overflow logic means can be provided which determines from the (M+N+P+1)th bit whether an overflow has occurred in the M+N+P bit result. Preferably, this logic means is extended to determine whether any portion of the M+N+P+1 bit result, not selected for output, has overflowed.

Format adjustment is also provided in a way that differs from conventional multiplier-accumulator designs. In accordance with the invention, a format adjust means is provided which is selectively responsive to a format adjust instruction for shifting the entire output accumulator contents a predetermined number of bits within a range of zero to at least P bits, and preferably P+1 bits, in the direction of the most significant bit.

In yet another aspect of the invention, the multiplier-accumulator output means includes a first output means for outputting the M most significant bits, the second output means for outputting the N next most significant bits, and third, extended output means for outputting the P least significant bits of the accumulator contents. The various arrays of data are ordered from most significant to least significant bit at each step in the multiplier-accumulator's operation. In this architecture, the least significant bits of a final Z result output from the accumulators are retained and available for output on the extended output means. This is a reversal of the arrangement utilized in the prior art, which positions the extended precision registers and bits in a more significant position than the most significant bit registers.

This novel arrangement has a number of advantages. In conjunction with format adjusting, as summarized above, the most significant bits and least significant bits of these products can always be aligned with the first and second output means, respectively. Instead of truncating least significant bits, as occurs in prior multiplier accumulators when a product is rightshifted, i.e., toward the least significant bits, the present invention retains the least significant bits in the extended registers so that they are available for output if desired.

The invention further provides an improved rounding capability. A product can be selectably rounded to the nearest M+N or M most significant bit and is correct for all format adjusted results.

Another enhancement provided by the invention is an improved ability to load the accumulator means directly from the input operands. In response to a load instruction, the X and Y operands are concatenated into a single 32-bit result, instead of being multiplied. This signed or unsigned number can be accumulated, fed back to the adder, rounded, format adjusted and tested for status just like the product. This is valuable for use not only for operations on subsequent products and variables but also for system test purposes. It provides for direct testing of each function and flag as well as a direct path from input buses to output bus.

Preferably, the invention is implemented with two accumulators. A further feature of the invention is a capability to transfer the M+N+P contents of one accumulator into the other. This capability is useful in many applications, for example, in computation of Fourier transforms or in rounding previously unrounded numbers.

In a preferred embodiment, a high-speed 16×16 bit fixed-point multiplier-accumulator is fabricated with high-speed VLSI bipolar technology. In its operation, two 16-bit operands of unsigned, two's complement signed or mixed mode are multiplied or concatenated to produce a 32-bit result. This result or its complement or zero may be loaded into either or both of two 40-bit accumulators. Or, the result can be added to or subtracted from either of the two accumulators and returned to either or both accumulators. The contents of either accumulator can be subtracted from the 32-bit result and returned to either or both accumulators. The contents of one accumulator can be transferred to the other accumulator. Transfer or addition operations can include a 16-bit right shift of the source accumulator contents. Any accumulate operation includes provision for rounding to the nearest 16- or 32-bit result.

Operands are selected from one of two registers on each input port. These registers can be made transparent for flow-through operation. All 40-bits of the accumulators are available for output in parallel on separate pins or can be multiplexed onto a single 16-bit port. The 40-bit output accumulator contents are tested for sign, zero and overflow and three status flags generated. A ten position format adjust left shifts any 40-bit accumulator contents for a fully correct 40-bit output. Rounding and overflow are determined for the format adjusted output. Overflows are corrected by automatic substitution of a saturation value in place of the overflowed one.

Accumulator functions are selected by an eleven-bit instruction register which is clocked or made transparent with the input operand registers. Accumulator registers have a separate clock with individual enables. Output format adjustment and multiplexing are selected by a nine-bit instruction register with its own clock and transparent flowthrough selection.

The foregoing and other objects, features and advantages of the invention will become more readily apparent from the following detailed description which proceeds with reference to the drawings.

BRIEF DESCRIPTION OF THE DRAWINGS

FIGS. 1A, 1B and 1C are tables of the operational instructions, the format adjust control instruction and output multiplexer control instructions for a multiplier-accumulator according to a preferred embodiment of the invention.

FIG. 3 is a diagram of the intermediate result Z formats operations for multiplier-accumulators of FIGS. 1A, 1B, 1C and 2.

Figure 4:
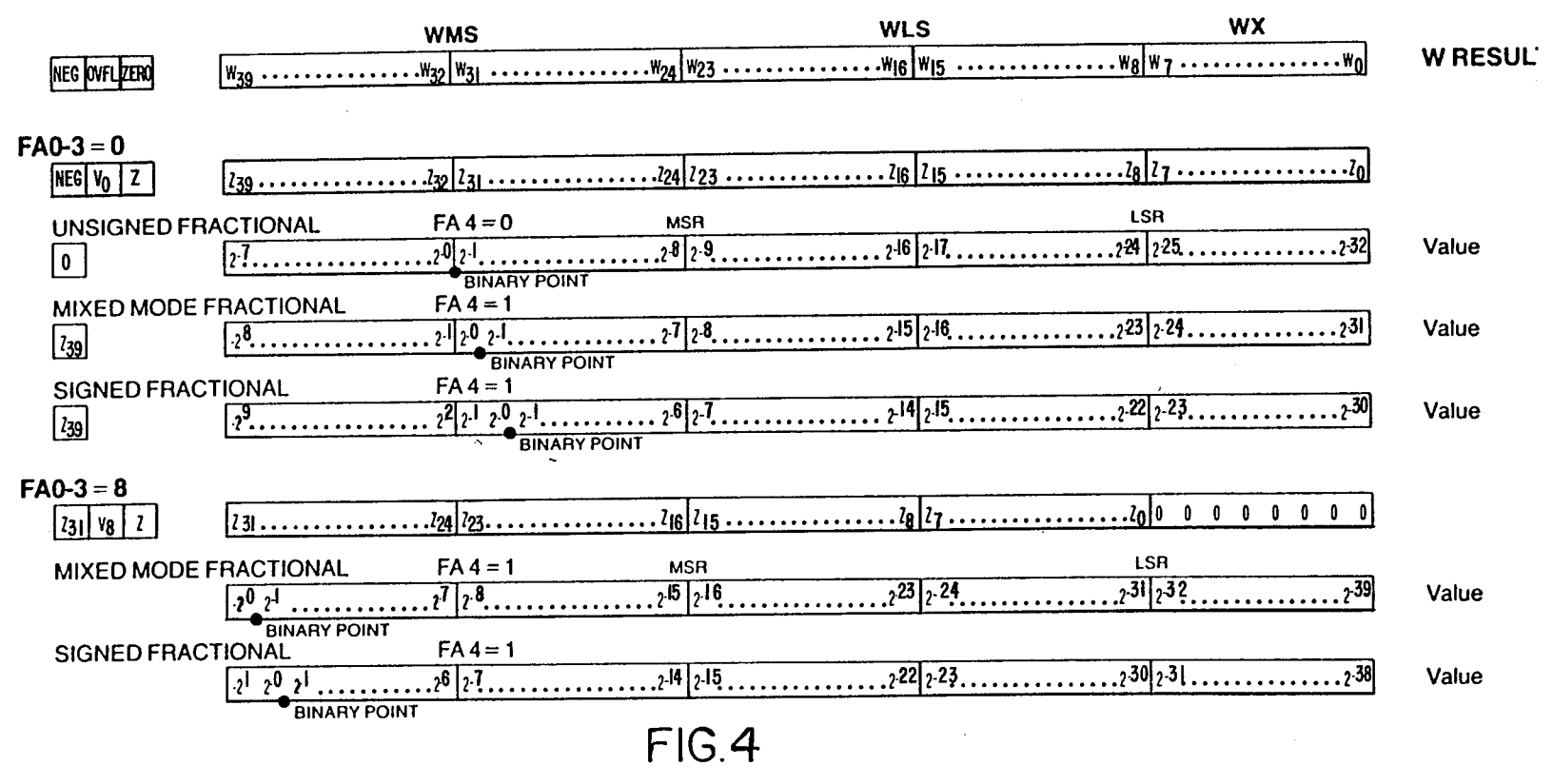
Figure 4:
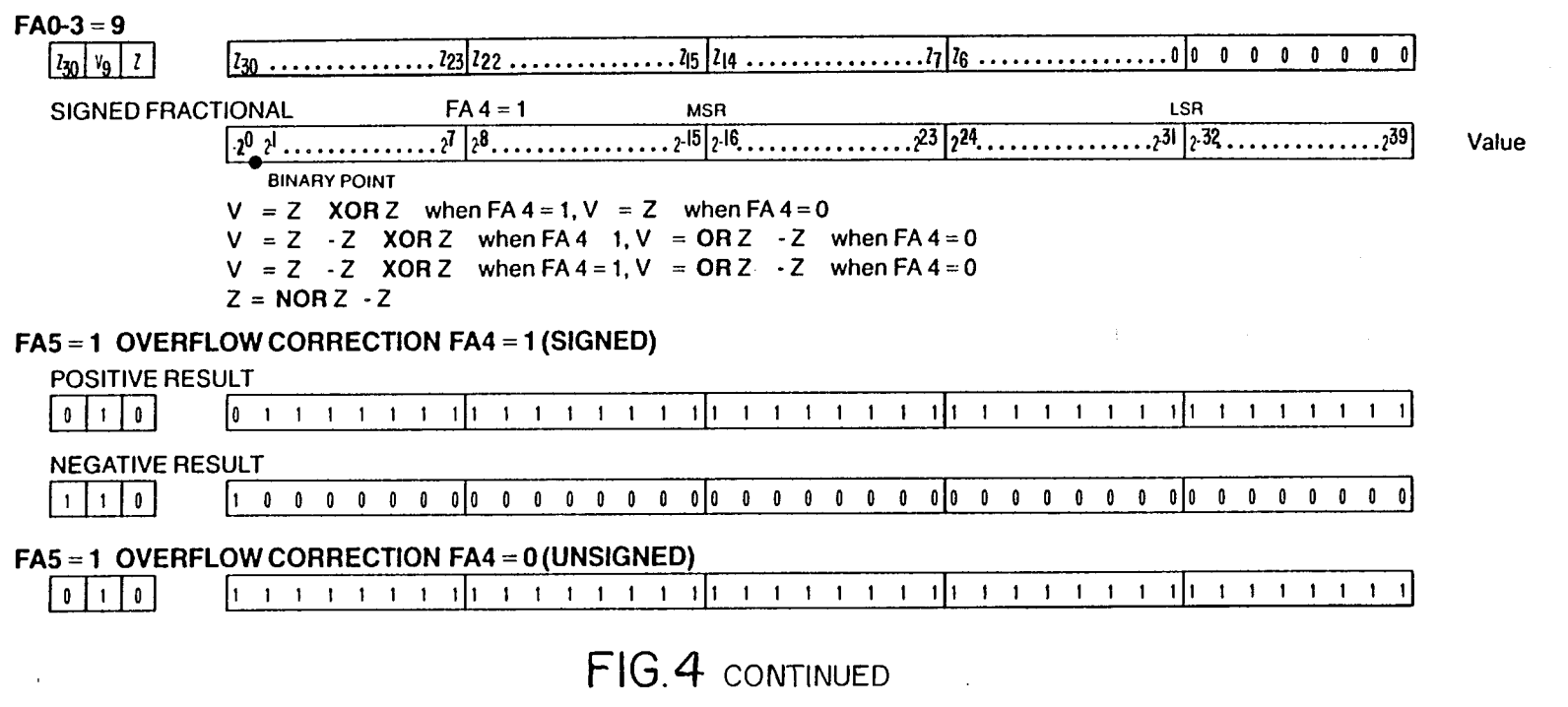

FIG. 4 is a diagram of the final result W formats, status flags, overflow correction and format adjust operation for the multiplier-accumulator of the invention.

Figure 5:
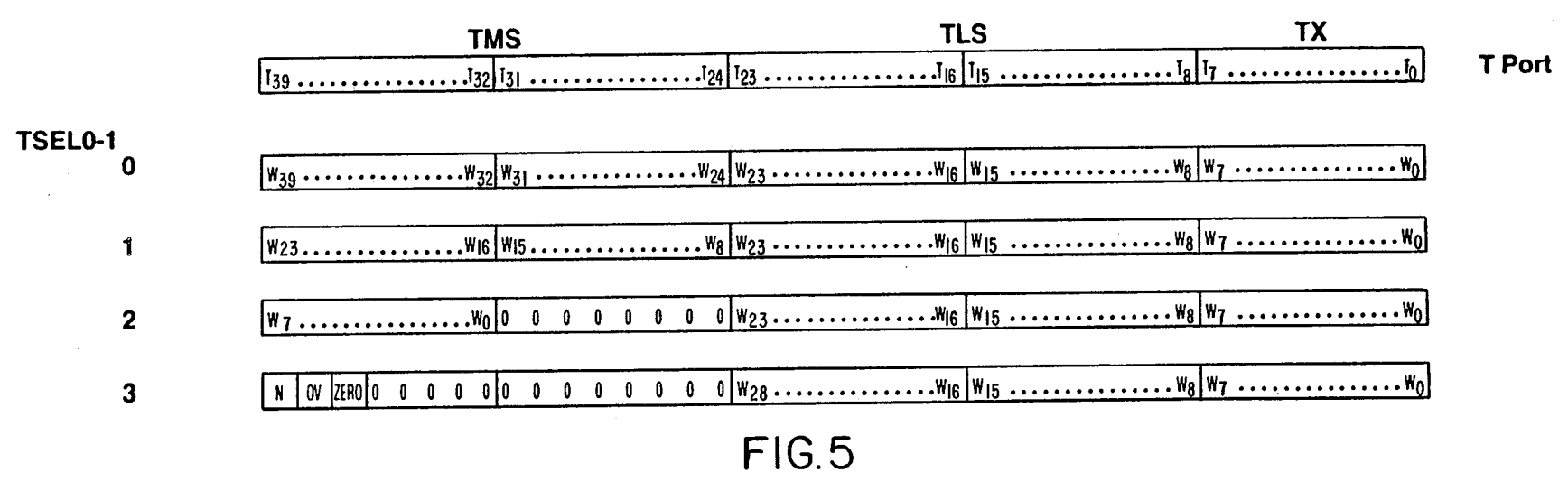

FIG. 5 is a diagram of the output multiplexer operation for the multiplier-accumulator of the invention.

FIG. 7a, 7b, 7c are timing diagram of various clocking alternatives for the multiplier-accumulators of FIGS. 6A and 6B.

FIGS. 9, 10 and 11 are diagrams showing various mathematical functions and their respective implementations with a multiplier-accumulator according to a preferred embodiment of the invention.

BRIEF DESCRIPTION OF THE TABLES

Table 1 is the operating sequence for the multiplier-accumulator implementation of FIG. 11.

Table 2 is the operating sequence for the multiplier-accumulator implementation of FIG. 10.

Figure 6A:
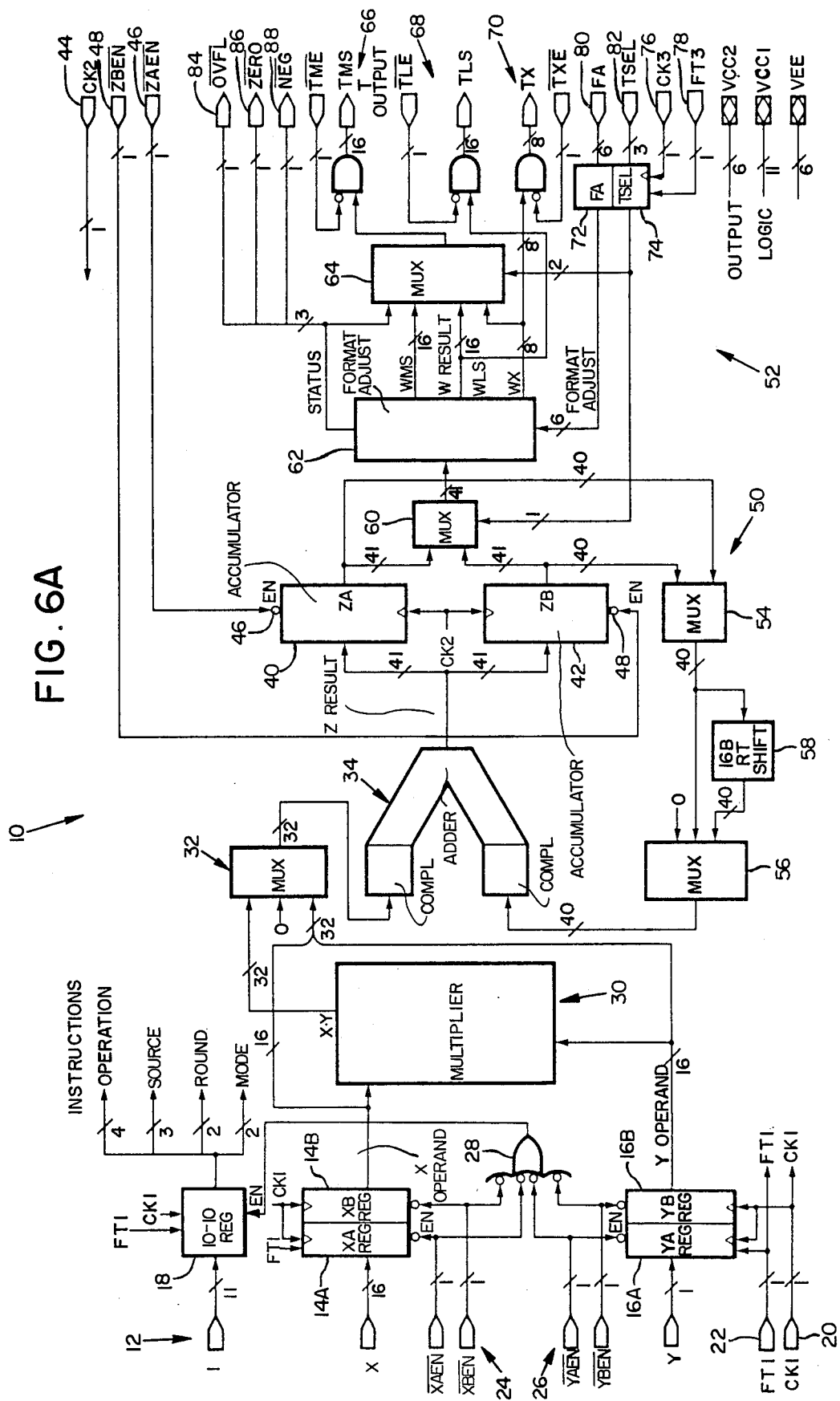
FIG. 6A is a functional block diagram of an emitter-coupled logic (ECL) multiplier-accumulator according to the invention.
Figure 6B:
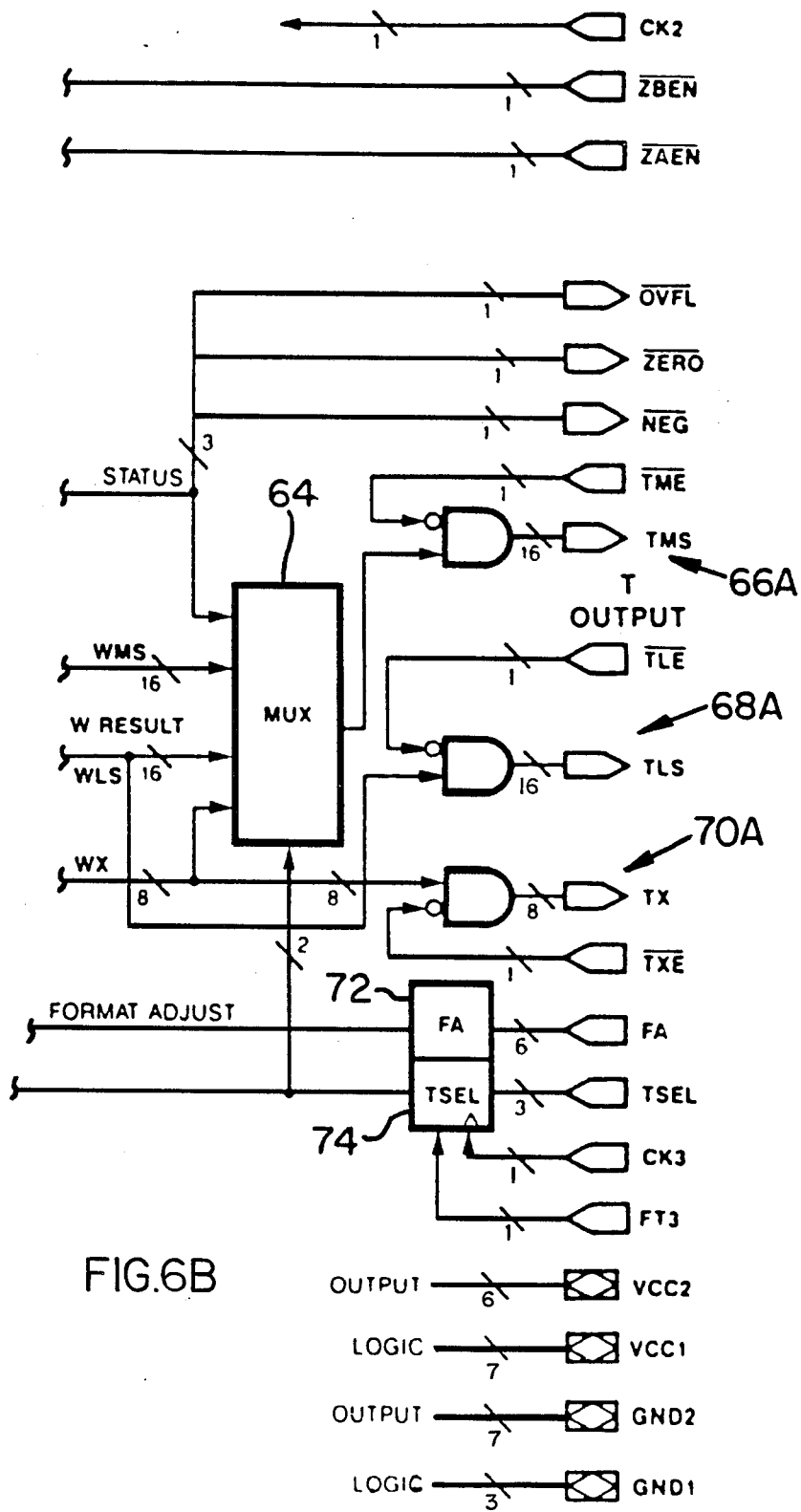
FIG. 6B is a partial block diagram of a multiplier-accumulator similar to that of FIG. 6A, as arranged to be used in a transistor-transistor logic (TTL) system.
Figure 7A:
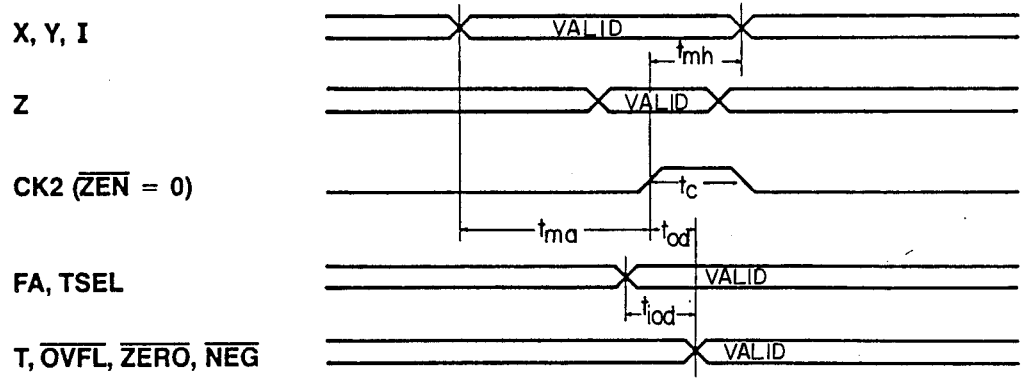
Figure 7B:
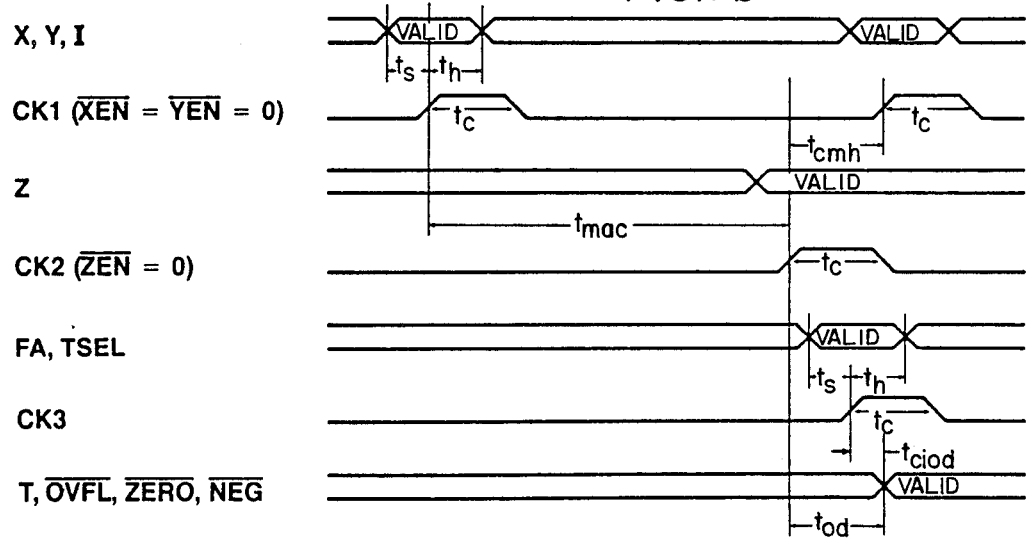
Figure 8A:
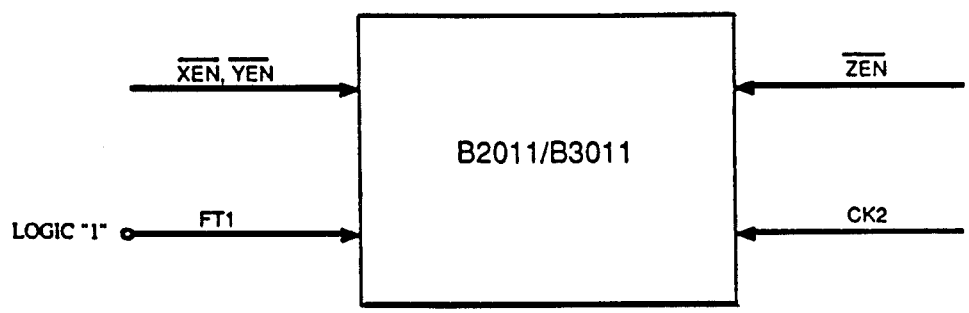
FIG. 8a, 8b, 8c, 8d are series of simplified block diagrams of the multiplier-accumulators of FIGS. 6A and 6B, showing the various input and output clocking alternatives.
Figure 8B:
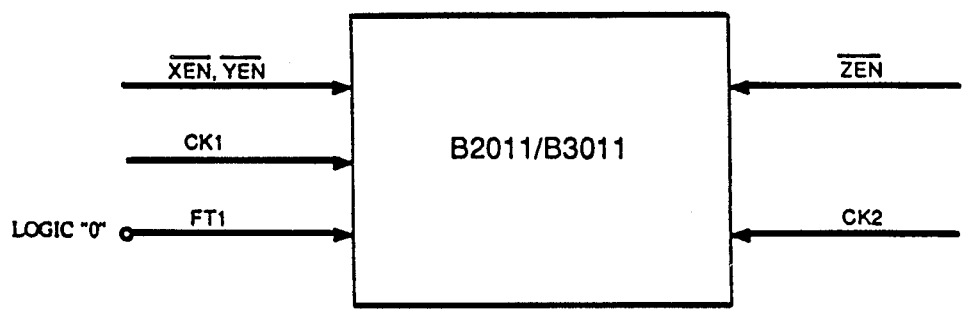
Figure 8C:
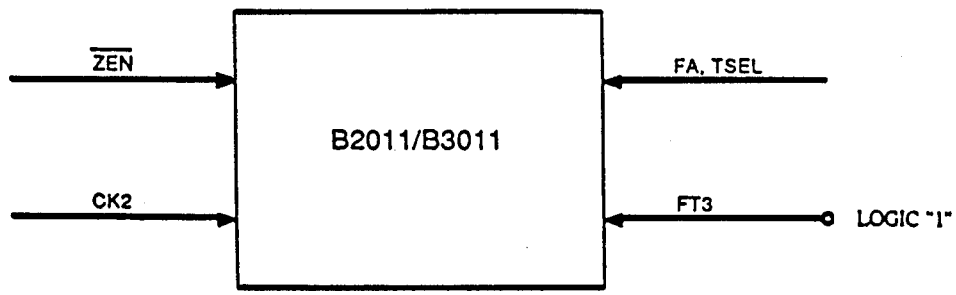
Figure 8D:
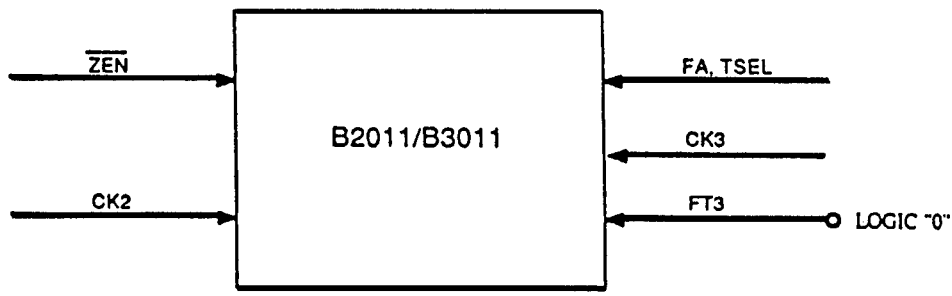

Table 3 is a listing of the input and output signals and pins of integrated circuits embodying the multiplier-accumulators of FIGS. 6A and 6B, respectively, and glossaries defining the input and output signals thereof.

Table 4 is a glossary of the instructions of FIGS. 1A, 1B and 1C.

Tables 5 and 6 are tables of recommended operating and test conditions and electrical characteristics of the multiplier-accumulators of FIGS. 6A and 6B, respectively, as implemented in a bipolar VLSI circuit in accordance with a preferred embodiment of the invention.

DETAILED DESCRIPTION

General Arrangement

The multiplier-accumulator of the present invention is implemented in both ECL and TTL versions, as shown functionally in FIGS. 6A and 6B. The architecture and much of the circuitry is common to both versions. Functionality of the multiplier-accumulator remains the same in both logic families, except that a minimum gate-delay implementation is used in inputs and outputs of the ECL multiplier to take maximum advantage of the inherent speed of the emitter-coupled logic family. Elements common to both versions are described with reference to the ECL version, shown in FIGS. 6A and 12, and identified by like reference numerals. The features that are unique to each version are separately described and uniquely identified by reference numerals in their respective figures.

Specifics of the circuitry required in each version to adapt to the particular logic family are within the skill of the ordinary designer and so are not described. ECL 10KH input and output buffers provide a low internal delay and, when driving terminated 50 ohm lines, provide a low output delay, even when bus structures are used. On-chip operation times of under 15 ns. can also provide a substantial benefit in TTL systems. Lead lengths are kept short so that loaded TTL output delays between chips are within the same range as operation times. Thus, pipelined data rates in the TTL multiplier can approach the scalar rates of the ECL multiplier. The TTL interface is preferably slowed to broadly match the transition rates and transition times of advanced Schottky TTL logic for easy circuit design. This results in lower power dissipation in the TTL multiplier-accumulator compared to the ECL version.

Both families of the multiplier-accumulator circuit are fabricated by the bipolar VLSI process described in the last two articles cited above. This process utilizes a self-aligned polysilicon bipolar process with a minimum mask features size of 2 um. The transistor area produced by this process is 14 um$^2$, with a single polysilicon contact layer and metal interconnection lines provided by two layers of 4 um-pitch gold metallization. A typical transistor has a cutoff frequency $f_t$ greater than 5 GHz at 50 uA and a loaded gate propagation delay of 300-450 ps. The multiplier has an array size of 121×135 mils, for 11,600 transistors required, and at room temperature dissipates about 1.8 W. The chip is mounted in a 132-pin two-layer ceramic pin-grid-array (PGA) package, directly on a metal slug, which provides a low profile and low thermal resistance. Separate power supply pins are provided for the internal array and the output buffers to assure maximum noise margins. Multiple output ground pins are used to minimize signal path resistance and inductance for the outputs, which are terminated at 50 ohms. Ground planes within the two-layer PGA package maintain the transmission line impedance and minimize cross talk.

Multiplier-Accumulator Architecture

Referring to the left portion of FIG. 6A, data and arithmetic and logic instructions are input to multiplier-accumulator 10 via a set of input ports, generally designated by reference numeral 12.

Figure 2:
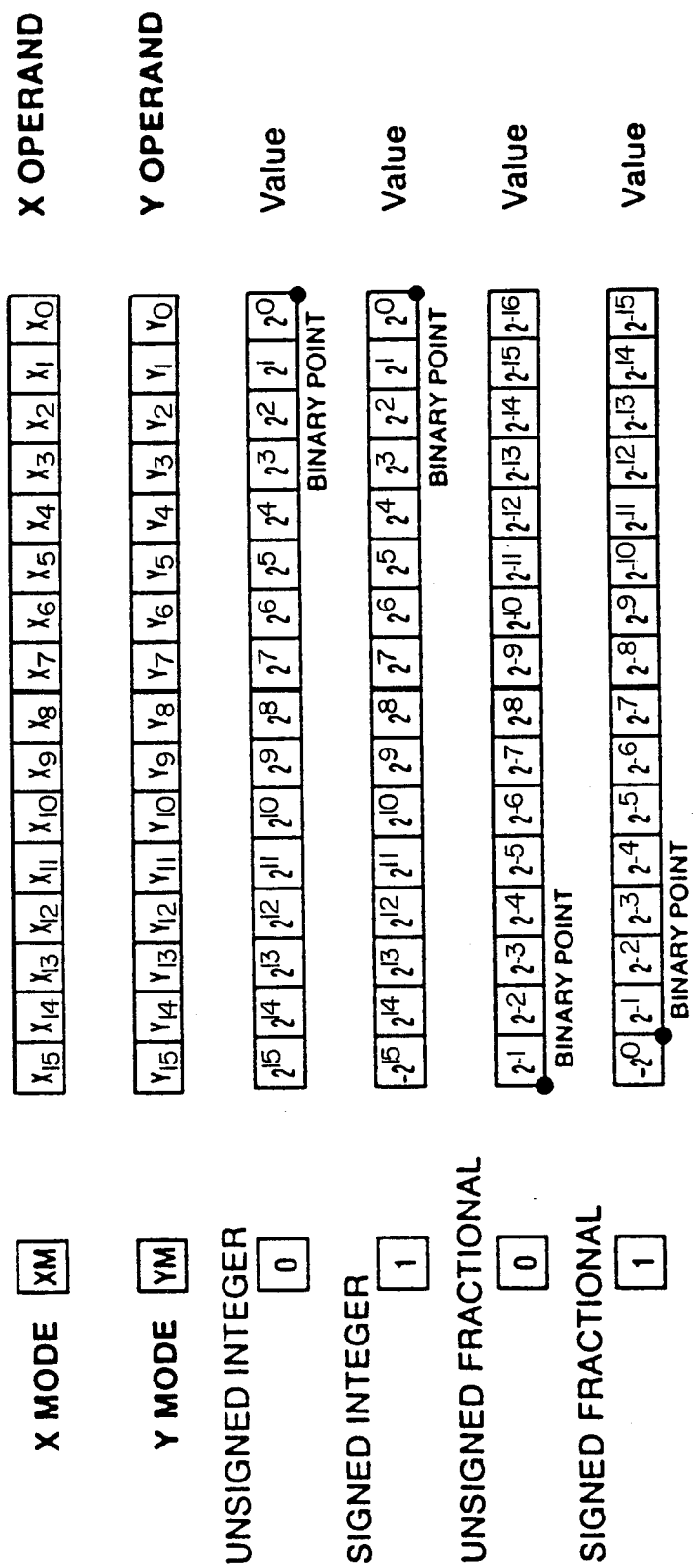
FIG. 2 is a diagram of input operand formats and sign mode operation for a multiplier-accumulator according to the invention of FIGS. 1A and 1B.
Figure 12:
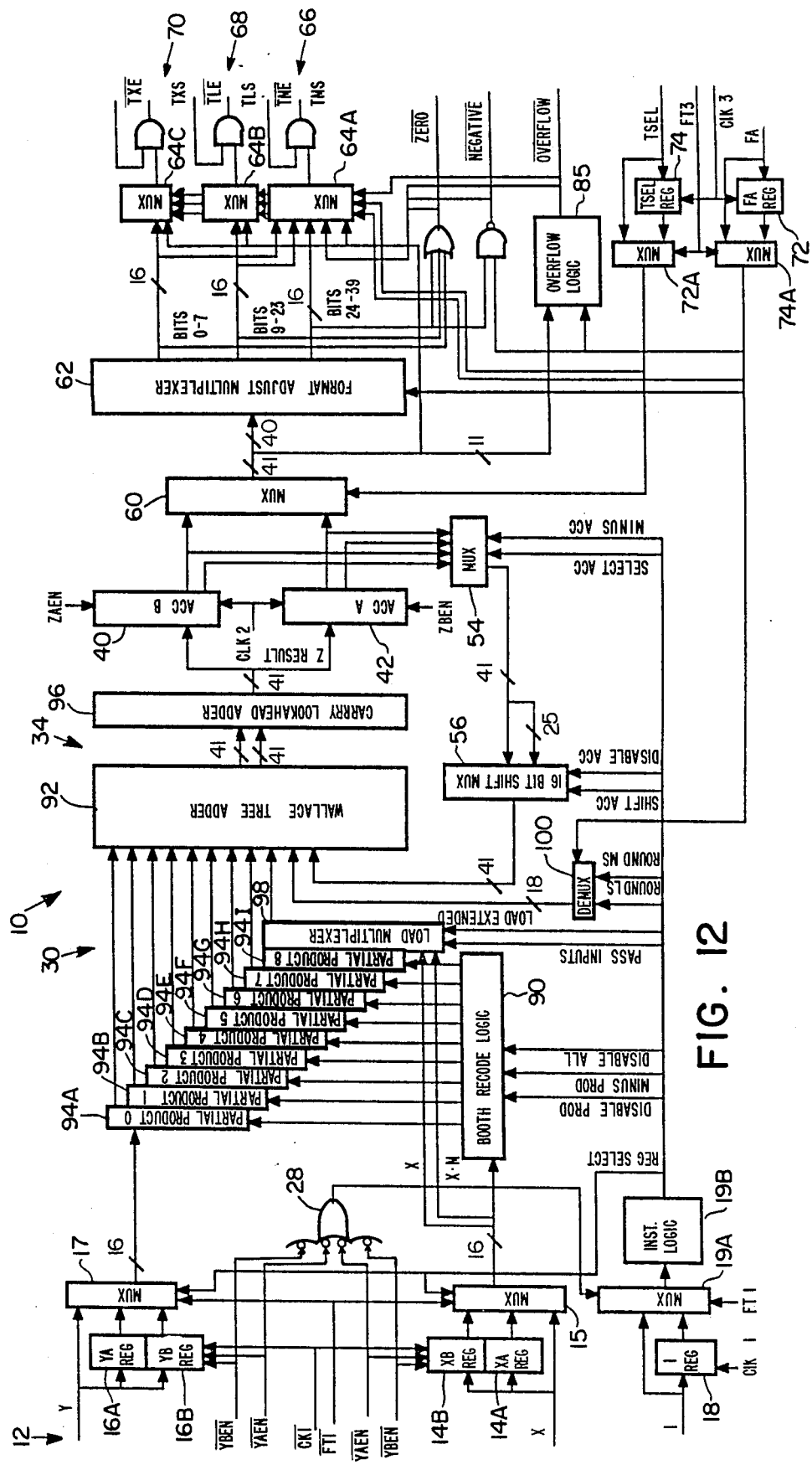
FIG. 12 is a more detailed block diagram of the multiplier-accumulator of FIG. 6A.

X-operands and Y-operands are typically input, in the format shown in FIG. 2, to pairs of individually-selectable, 16-bit X-registers 14A, 14B and Y-registers 16A, 16B. The arithmetic, logic and other instructions shown in FIG. 1A are input, in encoded form, to an 11-bit instruction register 18. As shown in FIG. 12, the operands and all instructions can also be input in a flow-through mode, bypassing these registers. Each register has a clock input 20 (CK1) and a first flow through select input 22 (FT1) for selecting clocked or unclocked operation.

Selection between the pairs of X-registers and between the pairs of Y-registers is controlled by enable input circuitry 24, 26, respectively. This circuitry includes an enable input for each operand register, and each enable input is also connected to an inverted input of an OR gate 28. The output of OR gate 28 is connected to an enable input of instruction register 18.

Table 3, below is a listing of the input and output signals and pins of integrated circuits embodying the multiplier-accumulators of FIGS. 6A and 6B, respectively, and glossaries defining the input and output signals thereof.

The X- and Y-operands are input to a multiplier 30. The multiplier outputs a result that is, selectably, a product of multiplication or of concatenation of the operands, or all zeroes as further described below in connection with FIG. 12. In a 16×16 multiplier, this result includes 32 parallel bits consisting of sixteen least significant bits and sixteen most significant bits, each ordered from least to most significant bits. The result is input to a first or product input port 36 of an adder 34. A multiplexer function 32 selects, as the result to be input to the adder, either the product of multiplication, the result of concatenation, or zeroes. The adder has a second, accumulator contents input port 38. The result, and another binary number input via port 38 are added by adder 34. Selectably, either of these numbers can be two's complemented, before being input to the adder, for subtraction.

The result of operation of the adder is output as an intermediate Z result. This result is input to accumulator means, which preferably comprises two registers or accumulators 40, 42. Each of these accumulators has a second clock input 44 (CK2) and separate accumulator enable inputs 46, 48, respectively. The intermediate Z result can be input, selectably, into either or both of the accumulators. Data in either of the accumulators can be output, selectably, either into a feedback path 50 or, as a final Z result, into output circuitry 52.

The feedback path 50 includes a multiplexer 54 for selecting output data from either of the accumulators. This data is then input to a two-to-one multiplexer-with-enable 56 incorporating a 16-bit right shift function 58. The right-shift function has a 16-bit right-shifted output. Disabling multiplexer 56 causes it to output all zeros. The selected output of multiplexer 56 is input to adder input port 38.

Operation of the multiplier-accumulator 30 up to this point is controlled by the instructions of FIG. 1A input via instruction register 18.

The output circuitry 52 includes a two-to-one multiplexer 60 for selecting between the outputs of the accumulators and outputting the selected accumulator contents as a final Z result. This result is input to a format adjust multiplexer 62. The format adjuster 62 is arranged to perform a left shift on the final Z result that is selectable over a shift range of zero bits to nine bits. The format adjusted Z result is output as a W result to a final output multiplexer 64 and to three sets of output gates 66, 68, 70.

Operation of accumulator output multiplexer 60, format adjuster 62 and W result output multiplexer 64 are controlled by the format adjust control instructions of FIG. 1B input through format adjust register 72 and output control inputs to output select register 74. These registers have a third clock input 76 (CK3) and a second flow-through select input 78 (FT3). The format adjust input register 72 has an encoded 6-bit wide instruction input 80. The format adjust control instruction set is shown in FIG. 1B. The output select register 74 has a 3-bit wide instruction input 82. The output instructions are shown in FIG. 1C.

In addition to outputting a selectably shifted W result, the output circuitry includes three status flags. These status flags are provided to separate status output ports 84 (OVFL), 86 (ZERO) and 88 (NEG). These status flags are also provided as inputs to output multiplexer 64 so that they can be selectably output as a part of the output data via output ports 66, 68, 70.

Referring briefly to FIG. 6B, a TTL version of the multiplier-accumulator is essentially identical to the ECL version shown and described with reference to FIG. 6A, except that provision is made for TTL compatibility of the inputs and outputs. Instead of using ECL AND gates in output ports 66, 68, 70, the TTL output ports 66A, 68A, 70A use TTL compatible tri-state output buffers. TTL conversion circuitry (not shown) is added to the inputs. Flag outputs are inverted to conform to different conventions in the two logic families.

Carry/Overflow, Format Adjust and Output Port Arrangement

Returning to FIG. 6A, the invention provides for a novel arrangement of data processing and storage registers and output ports. These are most easily described with respect to the example of a symmetric 16×16 bit multiplier-accumulator, but can be generalized to an N×M bit device.

When two 16-bit operands are multiplied, the product output from multiplier 30 and input to adder port 36 is 32 bits wide. Summation of this number with another number of a comparable number of bits commonly produces overflow bits. Most conventional 16×16 bit multiplier-accumulators provide an extended 3-bit register above the most significant 16-bit (MSW) register to handle these added bits.

The preferred embodiment adds eight more significant or carry bits. This will accommodate a minimum of 256 summations and up to 1024 summations with normally distributed data. One additional bit is added as a most-significant or overflow bit.

The adder output is accordingly structured to output a total of 41 bits. This includes 32 bits for the sum of the number of the bits in each of the operands, 8 carry bits and one additional bit, for a total of 41 bits. The accumulators are likewise structured to input and output a 41-bit result. The accumulators are structured in the form of an extended 8-bit register for receiving the eight least significant bits (bits 0–7); a 16-bit register for receiving bits 8–23 and a 17-bit register for receiving the most significant bits 24–39 and overflow or carry bit 40.

The data input at the adder ports is always aligned, upon input, with its least significant bit in the least significant bit position of the adder array. The Z result output from the adder is similarly aligned so that its least significant bit is positioned in the least significant bit position of the selected accumulator.

The entire 41-bit accumulator contents is provided to output multiplexer 60. Only the lower 40 bits, however, excluding the 41st bit, are input to format adjuster 62. As further shown in FIG. 12, the 41st bit is input to overflow logic in the output. On the other hand, the entire 41-bit accumulator contents are input to multiplexer 54 of feedback path 50 for input to adder feedback port 38.

Generalizing the foregoing to an N×M bit multiplier-accumulator, X- and Y-operands of N and M bits, respectively, are input to the multiplier, which produces a product having a total of N+M bits. This product is input to an adder which outputs a Z result of N+M+P+1 bits to the accumulators. The accumulators can output the entire stored contents of N+M+P+1 bits. Only the lower M+N+P bits are output by the output circuitry 52. The (M+N+P+1)th bit is available in the accumulator contents for overflow and status indication. When the accumulator contents are output to the feedback path 50, however, all M+N+P+1 bits are transmitted back through the feedback path to the feedback port of adder 34.

When accumulator contents are output to the format adjuster 62, as a final Z result, this Z result is initially input with the least significant bit of the accumulator contents in the least significant bit position of the format adjuster. The format adjuster is structured to provide a capability of selectably shifting the input lower M+N+P bits of the accumulator contents over a range of zero bits (unshifted) to P+1 bits. The direction of any shift is always in the direction of the most significant bits. The shifting range of P+1 is used to match the number P of carry bits provided by the adder and provide one additional bit of shifting range to enable the Z result to be aligned with a binary point in the operands in fractional or mixed mode arithmetic.

The outputs are arranged to output the sixteen most significant bits of the format adjusted W result (bits 24–39) via output port 66 (TMS); the next most significant 16-bits (bits 9–23) via output ports 68 (TLS); and the least significant 8 bits (bits 0–7) via outextended output port 70 (TX). The output data can be readily rounded to 32 bits or the 16 most significant bits, in cooperation with format adjustment, as further described hereinafter.

Implementation of Instruction Set

FIG. 12 shows further details of implementation, in multiplier-accumulator 10, of the instruction set of FIG. 1A.

First referring to the input ports 12, the operand inputs are implemented with a first 3:1 multiplexer 15 for the X-operand and a second 3:1 input multiplexer 17 for the Y-operand. Each of these multiplexers has two inputs, the outputs of the respective pairs of registers for the associated operand. Additionally, they each have an input responsive to the flow-through signal (FT1) for directly inputting the operand, by-passing both of the registers.

The instruction register 18 is similarly implemented with a 2:1 multiplexer 19A to logic 19B, selectable to input instructions either through register 18 or directly, bypassing register 18. The source instructions in FIG. 1A include instructions output through multiplexer 19 to multiplexers 15, 17 for selecting among the three inputs for each operand.

The operand "Source" instructions in FIG. 1A and the flow-through signal FT1 control inputting of the operands. The operand "Mode" instructions identify the mode (signed or two's complement) of each operand.

The multiplier array 30 is implemented with modified Booth recode logic 90, a Wallace tree adder 92 implemented with carry/save adders, a series of 9 circuit arrays 94a through 94i for generating 18-bit partial products, and a carry/lookahead adder 96 for summing the final product and binary number input from feedback path 50.

In operation, the Y operand is input from multiplexer 17 to register 94a together with a Y-operand mode bit from the instruction logic 18, 19 (YM). Each array 94 is implemented by a 16-bit-wide, two-input exclusive OR gate and an 18-bit-wide 2:1 multiplexer-with-enable (not shown). The multiplexer provides 17 output bits corresponding to the partial product. An 18th bit (the subtract bit) is provided to complete a two's-complement inversion.

The X-operand is input to the Booth recode logic 90 from the X-operand multiplexer 15, together with an X mode bit (XM) from the instruction logic 18, 19. The Booth recode logic has three outputs connected to each of circuit arrays 94a through 94i: shift, subtract and disable. Each three outputs corresponds to two transitions between each three bits of the X operand, commencing with the two least significant bits, which operate on the Y operand to form each partial product in turn.

The arrays for generating the partial products are offset from one another in two bit increments so that the two least significant bits of partial product zero from array 94a are output together with the subtract bit directly to the Wallace adder. The next two bits of partial product zero are added together with the two least significant bits of partial product one and its subtract bit from array 94b and the sum is output to the next two inputs of the Wallace tree adder. This procedure continues for the remaining intermediate partial products in array 94c–94h through the last partial product 8 in register 94i. Partial product 8 is offset relative to partial product zero by 16 bits. The Wallace tree adder accumulates two thirty-two bit words which are output in parallel to carry/ahead adder 96, which adds these words together to produce the intermediate Z product, which is output to the inputs of accumulators 40, 42. The structure and operation of the modified Booth recode logic, the partial product arrays, the Wallace tree adder and the carry/lookahead adder are substantially conventional and so need not be further described.

The Booth recode logic controls the partial product generation. If the instruction being executed is a multiply, normal two-bit shift recoding is done. The implementation so far described enables the "Load Product" and "ACC Plus Product" instructions of FIG. 1A. If the instruction is one that subtracts the product from the accumulators, then the partial products are changed to their two's complement before summing. This implements the instructions "Load Minus Product" and "ACC Minus Product."

The basic structure of the multiplier 30 has been modified to enable the X and Y operands to be loaded directly from the inputs to the output of the adder without multiplication. This is done in the following way. A load multiplexer 98 is provided in tandem with register 94i. The load multiplexer has a 16-bit input from the X operand multiplexer 15 and a single X-mode bit. A "load input" instruction output from instruction circuitry 18, 19 is connected to a select input of the load multiplexer to control its operation. The load multiplexer, when selected, substitutes the X operand for the outputs from partial product 8. The "load input" instruction also controls the disable input of the Booth recode logic 90.

The circuitry of the Booth recode logic is arranged to respond to the "Disable Product" instruction by disabling partial product one through partial product 7 and forcing partial product zero equal to the Y operand. During operation, the Y operand is input into partial product zero and all of the intermediate partial products 1 through 7 are set to zero (i.e., disabled). The X operand is input into the load multiplexer and multiplexed to the inputs of the Wallace tree adder at bit positions 16–31, in place of partial product 8. When the outputs of the partial products and the load multiplexer are summed through the Wallace tree adder and carry/lookahead adder, the Z result is a thirty-two bit word in which the Y operand is concatenated with the X operand. Since the least significant bit of partial product 8 is one bit more significant than the most significant bit of partial product zero, this has the effect of concatenating X and Y. Because the concatenated X and Y result is inserted before the Wallace tree, it is output to the accumulators in the same form as a result of multiplication and summation.

Figure 9:
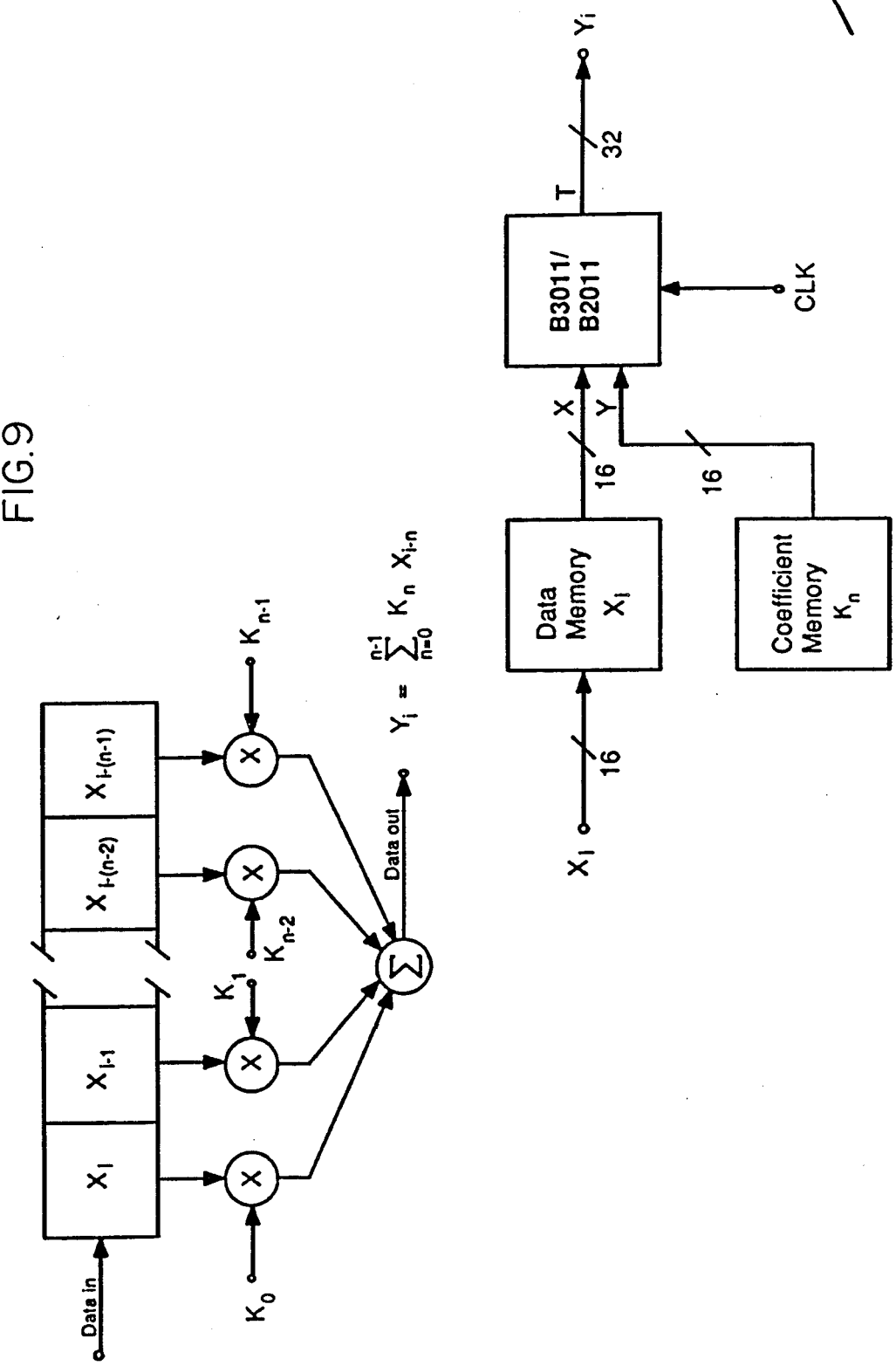

The ability to concatenate operands without multiplication makes possible the "Load Input" and "ACC Plus Input" instructions. Together with the ability to complement operands, it makes possible the "Load Minus Input" and "ACC Minus Input" instructions. Such concatenation is particularly useful in complex arithmetic operations such as the example shown in FIGS. 9 and 11 and Tables 1 and 2 as follows: A "Load input extended" instruction is also provided to enable preloading all 40 bits of the accumulator. For extended loads, all partial products are disabled and the least significant 8 bits of the next X operand are multiplexed into the top 8 bits of the Wallace tree adder.

The Booth recode logic is also operable, in response to a "Disable All" instruction, to set all of the partial products to zero, including partial product zero, so that the product is zero.

FIG. 6A shows the adder as having selectable complementing functions associated with each of its input ports 36, 38. The complement function associated with product input port 36 is actually implemented by the subtract function of the Booth recode logic. This function is controlled by the "Minus Product" input shown in FIG. 12.

The complement function associated with adder input port 38 is actually implemented in feedback path 50 upstream of the adder at multiplexer 54. As mentioned above, the entire circuit is implemented in emitter coupled logic (except for the input and output ports in the TTL version). In ECL, the accumulator registers have available as outputs both the true state of the accumulator contents and its inverse, from which the two's complement can be derived. Both of these states are input, for each accumulator, to 4:1 multiplexer 54. Thus, by selecting appropriately the output of the multiplexer, the two's complement of the selected accumulator can be input to port 38 of adder 34. This capability implements the "product minus ACC" and "input minus ACC" instructions of FIG. 1A.

The 16-bit right shift function 58 is implemented in 2:1 multiplexer-with-enable 56. This multiplexer has two sets of inputs. The first set of inputs is the entire 41-bit contents (or its complement) from the selected accumulator. The other input is the most significant 25 bits of the output of multiplexer 54, wired to output in the least significant 25 bit positions of multiplexer 56. This feature implements the "load shifted ACC," "shifted ACC plus product" and "shifted ACC plus input" instructions of FIG. 1A.

Multiplexer 56 also includes an enable function with a "Disable Acc" input selectable to output all zeros to the Wallace tree adder. When added together with a zero product from the multiplier, the Z result input to the accumulators is zero. The instruction logic enables zeros to be input selectably in either the outputs of the partial products or the outputs of the feedback path 50 or both. The ability to select both enables the "load zero" instruction. The ability to select zeros input from the feedback path is used in operation of the "load product" and "load input" instructions. The ability selectably to force all of the partial products to zero enables the "load ACC" instruction.

This last instruction can be used in combination with the source accumulator instructions to transfer the contents of one accumulator to another. Table 4, below, is a glossary of the instructions of FIGS. 1A, 1B and 1C.

A demultiplexer 100 inserts a rounding bit into the Wallace tree inputs in one of 18 different places depending on whether the result is to be rounded to 16 bits or 32 bits and depending on the format adjust.

A rounding instruction from the instruction register 18, 19 enables rounding and selects between 32-bit and 16-bit rounding. An instruction from the format adjust instruction input 72 defines a window in which the data is to be used. The demultiplexer inserts one bit at the most significant bit position below the least significant bit position of the window.

Overflow logic 85 receives signals from the unshifted data (selected accumulator) and the format adjust to determine if an overflow has occurred. As the result is shifted to the left, more higher order bits must be used to determine if an overflow has occurred.

The Overflow logic looks at the most significant bit portion of Z result that is not selected for output and determines whether it contains any data. If so, this is deemed to be an overflow condition and causes an overflow status flag to be set. This logic includes an exclusive OR gate to determine whether or not the unselected bits are all the same. An AND gate determines if operating in unsigned arithmetic, whether the most significant bit is zero. The output of these two gates is input to an OR gate which outputs the overflow flag. If operating in signed, i.e., two's complement, arithmetic, the two most significant bits represent the sign and are the same unless an overflow has occurred.

The zero flag is active only when the entire 40-bit result is zero. The negative flag is set when the 41st bit of the result is a 1 and the output is in signed mode.

Output multiplexer 64 of FIG. 6A is preferably implemented by three separate multiplexers 64a, 64b and 64c. A 5:1 multiplexer 64a is provided on the MSP output (bits 24–39). This multiplexer can be used to output to most, least, or extended portion of the result, the status flags. Or, if an overflow has occurred and overflow correction is desired, the correct value is inserted depending on if the result is signed or unsigned and whether overflow or underflow has occurred. The least and extend output portions each have a 2:1 multiplexer 64b, 64c, respectively, for passing the result or the overflow-corrected result. Tables 5 and 6, below, show recommended operating and test conditions and electrical characterics of the multiplier-accumulators of FIGS. 6A and 6B, respectively, as implemented in a bipolar VLSI circuit in accordance with a preferred embodiment of the invention.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. In an integrated circuit, a multiplier-accumulator architecture comprising:
   first data input means for inputting a binary X-ray operand comprising an array of M parallel bits wherein M is an integer greater than 2;
   second data input means for inputting a binary Y-operand comprising an array of N parallel bits wherein N is an integer greater than 2;
   binary multiplier means for multiplying the X-operand and the Y-operand to produce a binary product in the form of a first array of M+N parallel bits;
   binary adder means for adding the binary product to a second binary array of M+N+P+1 parallel bits and outputting a Z result in the form of a third array of M+N+P+1 parallel bits, where P is a predetermined non-zero number of added bits and said 1 bit is a most significant bit;
   each array being ordered from most significant to the least significant bit;
   accumulator means for storing the Z result including the most significant bit as accumulator contents;
   feedback means for outputting the accumulator contents to the adder means as said second binary array of M+N+P+1 bits; and
   output means for outputting a selected portion of the least significant M+N+P bits of the accumulator contents.

2. A multiplier-accumulator architecture according to claim 1 wherein the output means includes means for outputting an overflow status flag in accordance with the (M+N+P+1)th bit.

3. A multiplier-accumulator architecture according to claim 1, wherein the output means includes means for outputting the entire M+N+P bits as one of a single parallel array and separate arrays of M bits, N bits and P bits, respectively; and means for setting an overflow status flag in accordance with the (M+N+P+1)th bit.

4. A multiplier-accumulator architecture according to claim 1 in which the output means includes means for setting a zero status flag when the entire third array of (M+N+P+1) bits is equal to zero.

5. A multiplier-accumulator architecture according to claim 1, including:
   means for inputting a format adjust instruction; and
   format adjust means selectively responsive to the format adjust instruction for shifting the entire Z-product a predetermined number of bits within a range of zero to P+1 bits in the direction of the most significant bit to produce a W-product of M+N+P parallel bits;
   the output means being arranged to output the W-product.

6. A multiplier-accumulator architecture according to claim 1, wherein the accumulator means includes two accumulators and means for separately enabling each accumulator to store the Z result in a selected one of the accumulators.

7. A multiplier-accumulator architecture according to claim 1 wherein each array is ordered from most significant to the least significant bit, the feedback means including means for shifting the accumulator contents that are output to the adder means by N bits in the direction of the least significant bit.

8. A multiplier-accumulator architecture according to claim 1, in which the output means is separate from the first and second input means and said output means includes means for outputting the entire Z result as a parallel array of M+N+P bits.

9. A multiplier-accumulator architecture according to claim 1 including:
means for inputting a load instruction into the multiplier means;
load means in the multiplier means responsive to the load instruction for concatenating the X operand and Y operand without multiplying said operands to produce as said product a result in which the M most significant bits are the X operand and the N least significant bits are the Y operand.

10. A multiplier-accumulator architecture according to claim 1 including:
means for inputting a load zeroes instruction into the multiplier means; and
load zeroes means responsive to the load zeroes instruction for inputting an array of binary zeroes into the inputs of the adder means for outputting as the Z result to set the accumulator contents equal to zero.

11. In an integrated circuit, a multiplier-accumulator architecture comprising:
first data input means for inputting a binary X-operand comprising an array of N parallel bits;
second data input means for inputting a binary Y-operand comprising an array of M parallel bits;
binary multiplier means for multiplying the X-operand and the Y-operand to produce a binary product in the form of a first array of N+M parallel bits;
binary adder means for adding the binary product to a second binary array of M+N+P parallel bits and outputting an intermediate Z result in the form of a third array comprising M+N+P parallel bits, where P is a predetermined non-zero number of added bits;
each array being ordered from most significant to the least significant bit;
accumulator means for storing the intermediate Z result as accumulator contents;
feedback means for outputting the accumulator contents via a feedback path to the adder means as said second binary array;
output means for outputting the accumulator contents from the feedback path as a final Z result;
format instruction means for inputting a format adjust instruction;
format adjust means positioned to receive the final Z result output from the accumulator means and responsive to the format adjust instruction for shifting the entire final Z result a predetermined number Q of bits within a range of zero to at least P bits in the direction of the most significant bit to produce a W result of N+M+P parallel bits; and
output means for outputting the W result from the multiplier-accumulator.

12. A multiplier-accumulator architecture according to claim 11, wherein the output means including first output means for outputting the M most significant bits, second output means for outputting the N next most significant bits, and third, extended output means for outputting the P least significant bits of the W result so that the least significant bits of the final Z result are retained and available for output in the W result.

13. A multiplier-accumulator architecture according to claim 11 wherein the third array consists of M+N+P+1 bits, the architecture including means responsive to the format adjust instruction for setting an overflow flag when a shift of the final Z result causes a most significant bit thereof to be shifted to a position above the most significant bit position in the W result.

14. A multiplier-accumulator architecture according to claim 11, wherein the third array consists of M+N+P+1 bits, the architecture including means responsive to the format adjust instruction for setting an overflow flag when the most significant bit in the third array indicates that the least significant M+N+P bits have overflowed.

15. A multiplier-accumulator architecture according to claim 11 including means for setting a zero status flag when the entire W result is equal to zero.

16. A multiplier-accumulator architecture according to claim 11, in which the operands and the results can each include a sign bit, the architecture including:
means for inputting to the format adjust means a mode instruction to indicate whether the final Z result is an unsigned or a two's-complement number; and
means responsive to the mode instruction for setting a sign status bit in accordance with a sign bit of the Z result.

17. A multiplier-accumulator architecture according to claim 11, in which the output means is separate from the first and second input means and including a multiplexer for outputting the entire W-product of M+N+P bits or a subset thereof, as a parallel array.

18. A multiplier architecture according to claim 11 including:
means for inputting a rounding instruction to round the final Z result to the M most significant bits; and
means responsive to the rounding instruction for adding a binary one to the (N+P+Q)th significant bit position of the final Z result.

19. A multiplier architecture according to claim 11 including:
means for inputting a rounding instruction to round the final Z result to the M+N most significant bits;
means responsive to the rounding instruction for adding a binary one to the (P+Q)th significant bit position of the final Z result.

20. A multiplier-accumulator architecture according to claim 11 including means responsive to said shifting of the final Z result to insert zero bits in the positions of a number of the least significant bits in the W product equal to the predetermined number of bits that the final Z result is shifted.

21. A multiplier-accumulator architecture according to claim 17 wherein the accumulator means includes two accumulators and means for separately enabling each accumulator to store the Z result in a selected one of the accumulators.

22. A multiplier-accumulator architecture according to claim 21, wherein the feedback means includes means for selecting which accumulator outputs its accumulator contents to the adder means.

23. A multiplier-accumulator architecture according to claim 22, wherein the output means includes means for selecting which accumulator outputs its accumulator contents from the multiplier-accumulator.

24. A multiplier-accumulator architecture according to claim 21, wherein the feedback means includes means for selecting which accumulator outputs its accumulator contents to the adder means and the output means including means for selecting which accumulator outputs its accumulator contents from the multiplier-accumulator architecture.

25. In an integrated circuit, a multiplier-accumulator architecture comprising:
first data input means for inputting a binary X-operand comprising an array of N parallel bits wherein N is an integer greater than or equal to 1;
second data input means for inputting a binary Y-operand comprising an array of M parallel bits wherein M is an integer greater than or equal to 1;
binary multiplier means for multiplying the X-operand and the Y-operand to produce a binary product in the form of a first array of M+N parallel bits;
binary adder means for adding the binary product to a second binary array of M+N+P parallel bits and outputting an intermediate Z result in the form of a third array comprising M+N+P parallel bits, where P is a predetermined non-zero number of added bits;
each array being ordered from most significant to the least significant bit;
accumulator means for storing the intermediate Z result as accumulator contents;
feedback means for outputting the accumulator contents to the adder means as said second binary array;
output means for outputting the accumulator contents as a final Z result from the multiplier-accumulator;
means for inputting a load instruction into the multiplier means; and
load means in the multiplier means responsive to the load instruction for concatenating the X operand and Y operand without multiplying said operands to produce a result in which the M most significant bits are the X operand and the N least significant bits are the Y operand.

26. A multiplier architecture according to claim 25, in which each array is ordered from most significant to the least significant bit;
the binary multiplier means including:
means for generating from said operands a series of ordered partial products including a first partial product comprising a first binary product of the least significant bit of the X operand times the Y operand, a last partial product comprising a second binary product of the most significant bit of the X operand times the Y operand, and at least one intermediate partial product comprising a third binary product of a bit between the least and most significant bits of the X operand times the Y operand;
means for ordering the partial products in an array in accordance with significance thereof such that each intermediate and last partial product is offset by a predetermined number of bits in the direction of the more significant bits from an adjacent partial product of less significance, and the first and last partial products are offset so that the least significant bit of the last partial product is more significant than the most significant bit of the first partial product; and
adder means for adding the partial products in accordance with their significance to produce said binary product;
the load means including:
first means responsive to the load instruction for inputting the Y operand into the first partial product;
second means responsive to the load instruction for inputting binary zeroes into the intermediate partial products; and
third means responsive to the load instruction for inputting the X operand into the last partial product, so that operation of the binary adder means concatenates the X operand and the Y operand to form the result.

27. A multiplier architecture according to claim 26 in which the third means comprises a multiplexer.

28. In an integrated circuit, a multiplier-accumulator architecture comprising:
first data input means for inputting a binary X-operand comprising an array of N parallel bits wherein N is an integer greater than or equal to 1;
second data input means for inputting a binary Y-operand comprising an array of M parallel bits wherein M is an integer greater than or equal to 1;
binary multiplier means for multiplying the X-operand and the Y-operand to produce a binary product in the form of a first array of M+N parallel bits;
binary adder means for adding the binary product to a second binary array of M+N+P parallel bits and outputting an intermediate Z result in the form of a third array comprising M+N+P parallel bits, where P is a predetermined non-zero number of added bits;
each array being ordered from most significant to the least significant bit;
accumulator means for storing the intermediate Z result as accumulator contents;
feedback means for outputting the accumulator contents to the adder means as said second binary array; and
output means for outputting the accumulator contents as a final Z result from the multiplier-accumulator;
means responsive to a round instruction for rounding the final Z result to one of an M+N bit or an M bit output result.

29. A multiplier-accumulator architecture according to claim 28, including:
means for inputting a format adjust instruction; and
format adjust means responsive to the format adjust instruction for shifting the final Z result a predetermined number of bits within a range of zero to P+1 bits in the direction of the most significant bit to produce a W-product of M+N+P parallel bits;
the output means being arranged to output the W-product.

30. In an integrated circuit, a multiplier-accumulator architecture comprising:
first data input means for inputting a binary X-operand comprising an array of N parallel bits wherein N is an integer greater than or equal to 1;
second data input means for inputting a binary Y-operand comprising an array of M parallel bits wherein M is an integer greater than or equal to 1;
binary multiplier means for multiplying the X-operand and the Y-operand to produce a binary product in the form of a first array of M+N parallel bits;
binary adder means for adding the binary product to a second binary array of M+N+P parallel bits and outputting an intermediate Z result in the form of a third array comprising M+N+P parallel bits, where P is a predetermined non-zero number of added bits;

each array being ordered from most significant to the least significant bit;

accumulator means for storing the intermediate Z result as accumulator contents;

feedback means for outputting the accumulator contents to the adder means as said second binary array; and output means for outputting the entire accumulator contents as a final Z result from the multiplier-accumulator, said output means being separate from the first and second data input means so that new operand data can be input while the result is output at the output means to enhance throughput;

the output means including first output means for outputting the M most significant bits, second output means for outputting the N most significant bits, and third, extended output means for outputting the P least significant bits of the accumulator contents so that the least significant bits of the final Z result are retained and available for output.

31. A multiplier-accumulator architecture according to claim 30 including means for rounding the final Z result selectably to one of an M+N bit or an M bit output result.

32. A multiplier-accumulator architecture according to claim 30, including:
    means for inputting a format adjust instruction; and
    format adjust means responsive to the format adjust instruction for shifting the final Z result a predetermined number of bits within a range of zero to P+1 bits in the direction of the most significant bit to produce a W-product of M+N+P parallel bits;
    the output means being arranged to output the W-product.

33. A multiplier-accumulator architecture according to claim 30, wherein the third array consists of M+N+P+1 bits, the architecture including means responsive to the format adjust instruction for setting an overflow flag when the most significant bit in the third array indicates that the least significant M+N+P bits have overflowed.

* * * * *

UNITED STATES PATENT AND TRADEMARK OFFICE
CERTIFICATE OF CORRECTION

PATENT NO. : 4,876,660
DATED : October 24, 1989
INVENTOR(S) : Robert E. Owen et al.

It is certified that error appears in the above-identified patent and that said Letters Patent is hereby corrected as shown below:

| | |
|---|---|
| Cover Page, | ABSTRACT, line 19, change "M+n+P+1" to --M+N+P+1--; |
| Column 6, | line 25, change "diagram" to --diagrams--; |
| | line 49, after "Table 4" insert -- (2 sheets)--; |
| Column 8, | before line 6, insert Table 3, attached hereto as a separate sheet; |
| Column 10, | line 25, change "(bits 9-23)" to --(bits 8-23)--; |
| Column 12, | line 19, change "11" to --10--; |
| | line 20, after "follows:" insert Tables 1 and 2, attached hereto as a separate sheet; |

UNITED STATES PATENT AND TRADEMARK OFFICE
CERTIFICATE OF CORRECTION

PATENT NO. : 4,876,660

DATED : October 24, 1989

INVENTOR(S) : Robert E. OWen, et al

It is certified that error appears in the above-identified patent and that said Letters Patent is hereby corrected as shown below:

| | |
|---|---|
| Column 13, | before line 11, insert Table 4, attached hereto and consisting of two sheeets; |
| Column 13, | before line 61, insert Table 5, attached hereto as a separate sheet. After Table 5, insert Table 6, also attached hereto as a separate sheet; |
| Column 14, | line 3 & 4, change "X-ray operand" to --X-operand--; |
| Column 15, | line 59, change "including" to --includes--; |
| Column 19 | line 18, after "N" insert --next--. |

Signed and Sealed this

Thirty-first Day of December, 1991

*Attest:*

HARRY F. MANBECK, JR.

*Attesting Officer*  *Commissioner of Patents and Trademarks*

Table 1: Operation sequence for double-precision multiplication

| Operation number | Input Register Enable | Input Comments | Source X | Source Y | Mode X | Mode Y | Instruction | Destination Accumulator | Comments | TSEL | Accumulator | Comments |
|---|---|---|---|---|---|---|---|---|---|---|---|---|
| 3" | XAEN,YAEN | $N_0 \to X_A, M_0 \to Y_A$ | | | | | | | | | | |
| 0 | XBEN,YBEN | $N_1 \to X_B, M_1 \to Y_B$ | A | A | 0 | 0 | Load product | $Z_A$ | $N_0 \times M_0 \to Z_A$ | | | |
| 1 | | | B | A | 1 | 0 | Shift accumulation plus product | $Z_A$ | $\frac{Z_A}{2^{16}} + N_1 \times M_0 \to Z_A$ | LS | $Z_A$ | $Z_A$  $P_0$ |
| 2 | | | A | B | 0 | 1 | Accumulation plus product | $Z_A$ | $Z_A + N_0 \times M_1$  $Z_A$ | | | |
| 3 | | | B | B | 1 | 1 | Shift accumulation plus product | $Z_B$ | $\frac{Z_A}{2^{16}} + N_1 \times M_1$  $Z_B$ | LS | $Z_A$ | $Z_A$  $P_1$ |
| 1 | | | | | | | (Round least-significant portion) | | | MS | $Z_B$ | $Z_A$  $P_3$ |
| 2 | | | | | | | | | | LS | $Z_B$ | $Z_B$  $P_2$ |

Table 2: Operation sequence for FFT butterfly

| Operation number | Input (read) | Instruction | Comments | Output (write) |
|---|---|---|---|---|
| 6" | | | | |
| 7" | $P \to X_A, R \to Y_A$ | | | |
| 0 | $Q \to X_B, S \to Y_B$ | Load product | $X_A \times Y_A \to Z_A = P \times R$ | |
| 1 | $M \to X_A, 0 \to Y_A$ | Accumulation minus product | $Z_A - X_B \times Y_B \to Z_A = P \times R - Q \times S = A$ | |
| 2 | | Accumulation plus input | $Z_A + X_A|Y_A \to Z_B = A + M = P'$ | |
| 3 | $P \to X_A, R \to Y_A$ | Input minus accumulation | $-Z_A + X_A|Y_A \to Z_A = M - A = M'$ | $Z_B \to P'$ |
| 4 | | Load product | $X_A \times Y_B \to Z_A = P \times S$ | $Z_A \to M'$ |
| 5 | $N \to X_A, 0 \to Y_A$ | Accumulation plus product | $Z_A - X_B \times Y_A \to Z_A = P \times S - Q \times R = B$ | |
| 6 | | Accumulation plus input | $Z_A + X_A|Y_A \to Z_B = N + B = Q'$ | |
| 7 | | Input minus accumulation | $-Z_A + X_A|Y_A \to Z_A = N - B = N'$ | |
| 0' | | | | $Z_B \to Q'$ |
| 1' | | | | $Z_A \to N'$ |

$X_A|Y_A$ means $X_A$ concatenated with $Y_A$

■SIGNAL SUMMARY (ECL)

| Data | | |
|---|---|---|
| Inputs | X0-15, Y0-15 | 32 |
| Output | TMS0-15, TLS0-15, TX0-7 | 40 |
| Control | | |
| Instructions | | |
| Operation | I0-3 | 4 |
| Source | I4-6 | 3 |
| Round | I7-8 | 2 |
| Mode | I9-10 | 2 |
| Flags | OVFL, ZERO, NEG | 3 |
| Register enables | XAEN, XBEN, YAEN, YBEN, ZAEN, ZBEN | 6 |
| Format Adjust | FA0-5 | 6 |
| Output Select | TSEL0-2 | 3 |
| Output Enables | TLE, TME, TXE | 3 |
| Flow through | FT1, FT3 | 2 |
| Clocks | CK1, CK2, CK3 | 3 |
| Power | | |
| Logic Gnd | VCC 1 | 11 |
| Output Gnd | VCC 2 | 6 |
| -5.2V | VEE | 6 |
| TOTAL | | 132 |

■SIGNAL SUMMARY (TTL)

| Data | | |
|---|---|---|
| Inputs | X0-15, Y0-15 | 32 |
| Output | TMS0-15, TLS0-15, TX0-7 | 40 |
| Control | | |
| Instructions | | |
| Operation | I0-3 | 4 |
| Source | I4-6 | 3 |
| Round | I7-8 | 2 |
| Mode | I9-10 | 2 |
| Flags | OVFL, ZERO, NEG | 3 |
| Register enables | XAEN, XBEN, YAEN, YBEN, ZAEN, ZBEN | 6 |
| Format Adjust | FA0-5 | 6 |
| Output Select | TSEL0-2 | 3 |
| Output Enables | TLE, TME, TXE | 3 |
| Flow through | FT1, FT2 | 2 |
| Clocks | CK1, CK2, CK3 | 3 |
| Power | | |
| Logic Gnd | GND1 | 3 |
| Output Gnd | GND2 | 7 |
| Logic +5.0V | VCC1 | 7 |
| Output +5.0V | VCC2 | 6 |
| TOTAL | | 132 |

■SIGNAL DESCRIPTION

Data

| | |
|---|---|
| X0-15 | X operand input port. Bit 0 is least significant |
| Y0-15 | Y operand input port |
| TMS0-15 | The most significant 16 bits of the 40-bit output port T |
| TLS0-15 | The least significant 16 bits of the most significant 32-bits of the 40-bit output port T |
| TX0-7 | The extended least significant 8-bits of the 40-bit output port T |

Control

| | |
|---|---|
| XAEN, XBEN, YAEN, YBEN, ZAEN, ZBEN | Enable inputs for registers XA, XB, YA, YB, ZA and ZB respectively |
| I0-I0 | Instruction input port to operation, source, round and mode instruction registers. The registers are enabled by XAEN, XBEN, YAEN or YBEN and clocked by CK1. See Figure 1a |
| NEG | Output status flag determined from the 40-bit result W. The NEG flag is set when the result, treated as a signed two's complement number, is negative. Correct for a signed or unsigned number as selected by the format adjustment |
| ZERO | Output status flag determined from the 41-bit output result Z. It is set when a result is all zeros |
| OVFL | The OVFL output status flag is set when, due to output format adjustment, the selected 41-bit accumulator contents exceeds what can be represented in the selected 40-bit output format of result W. Correct for a signed or unsigned number as selected by the format adjustment |
| TME, TLE, TXE | Output enables of the TMS, TLS and TX ports respectively. Data is output when TME, TLE, TXE = 0 |

| | |
|---|---|
| FA0-5 | Format Adjust register inputs which selects rounding position, left shifting of an accumulator for output through port T, output sign mode and overflow correction. See Figure 1b. Clocked with CK3 |
| TSEL0-2 | Inputs to TSEL register which selects data output through the TMS port. See Figure 1c. Clocked with CK3 |
| FT1 | Flow through mode control. Bypasses instruction registers and input registers XA, XB, YA and YB |
| FT3 | Flow through mode control. Bypasses input registers FA and TSEL |

Clocks

| | |
|---|---|
| CK1 | Clock input to input registers XA, XB, YA, YB and I. Data is clocked into the enabled register on the positive going transition of CK1 |
| CK2 | Clock input to accumulator registers ZA and ZB. The positive going transition clocks data into the enabled registers |
| CK3 | Clock input to registers TSEL and FA. The positive going transition clocks data into the registers |

Power (ECL)

| | |
|---|---|
| VCC1 | Most positive supply voltage to internal logic circuitry. Usually ground. |
| VCC2 | Most positive supply voltage to output circuitry. Usually ground |
| VEE | Most negative supply voltage |

Power (TTL)

| | |
|---|---|
| VCC1 | Positive supply voltage to internal logic circuitry |
| VCC2 | Positive supply voltage to output circuitry |
| GND1 | Negative supply voltage to internal logic circuitry |
| GND2 | Negative supply voltage to output circuitry |

Table 3

FUNCTIONAL DESCRIPTION

Instructions I0-I0 See Figure 1a.

Load Product and Load Minus Product (LP, LMP)
The 32-bit product (or its complement) of the X and Y operands is loaded into the least significant portion of the selected accumulator register(s). The result Z is the product sign extended to 41-bits if XM or YM = 1 or zero filled if XM = YM = 0.

Load Input and Load Minus Input (LI, LMI)
The 16-bit input operands X and Y are concatenated (and complemented) into the least significant portion of the 41-bit result Z and loaded into the selected accumulator register(s). X becomes the most significant portion of the least significant 32-bits and Y the least. The 32-bits is sign extended to 41-bits if XM = 1 or zero filled if XM = 0.

Load Input Extended (LIE)
The least significant 8-bits of operand X are concatenated with the least significant 32-bit Z from the selected source accumulator. The 41st bit is a sign extension of the 40th bit if XM = 1 or zero if XM = 0.

These Load Input instructions allow any 32- or 40-bit number, including previously generated accumulations, to be rounded, format adjusted, have status flags set or serve as an initial value for further accumulation. In addition they are valuable for system testing by providing a direct path through the multiplier-accumulator and greater access to the individual operations, status flags and registers.

ACC Plus Product (APP)
The 32-bit product of operands X and Y is added to the 40-bit contents Z of the selected source accumulator register and stored in the selected accumulator register(s).

ACC Plus Input (API)
The 32-bit concatenated operands X and Y are added to the 40-bit contents Z of the selected source accumulator register and stored in the selected accumulator register(s).

ACC Minus Product (AMP)
The 32-bit product of operands X and Y is subtracted from the 40-bit content Z of the selected source accumulator register and stored in the selected accumulator register(s). Subtraction is accomplished by a two's complementing operation on the product, even in the unsigned mode (XM = YM = 0). Thus the result Z must always be treated as a two's complement number unless care is taken that all results are positive numbers.

ACC Minus Input (AMI)
The 32-bit concatenated operands X and Y are subtracted from the 40-bit contents Z of the selected source accumulator register and stored in the selected accumulator register(s). Subtraction is accomplished by a two's complementing operation on X|Y, even in the unsigned mode (XM = YM = 0). Thus the new result Z must always be treated as a two's complement number unless care is taken that all results are positive numbers.

Product Minus ACC (PMA)
The 32-bit product of operands X and Y has the 40-bit contents Z of the source accumulator register subtracted and then loaded into the selected accumulator register(s). Subtraction is accomplished by a two's complementing operation on Z, even in the unsigned mode (XM = YM = 0). Thus the new result Z must always be treated as a two's complement number unless care is taken that all results are positive numbers.

Input Minus ACC (IMA)
The 32-bit concatenated operands X and Y have the 40-bit contents Z of the source accumulator register subtracted and then loaded into the selected accumulator register(s). Subtraction is accomplished by a two's complementing operation on Z, even in the unsigned mode (XM = YM = 0). Thus the new result Z must always be treated as a two's complement number unless care is taken that all results are positive numbers.

Shifted ACC Plus Product (SAPP)
The 40-bit source accumulator is arithmetically right shifted 16-bits, sign extended and added to the 32-bit product of the X and Y operands and stored in the selected accumulator(s).

Shifted ACC Plus Input (SAPI)
The 40-bit source accumulator is arithmetically right shifted 16-bits, sign extended and added to the 32-bit concatenated operands X and Y and stored in the selected accumulator(s).

Load ACC (LA)
The selected accumulator(s) is loaded with the 41-bit contents of the source accumulator. This is a "no operation" if the source and destination accumulators are the same, but it does permit rounding of previously accumulated data. Different source and destination effect a transfer from one accumulator to the other.

Load Shifted ACC (LSA)
The source accumulator is arithmetically right shifted 16-bits and stored in the selected accumulator(s).

Load Zero (LZ)
The selected accumulator(s) is loaded with 41 zero bits.

Table 4

Source Accumulator (SZA, SZB)
Selects 41-bit register ZA or ZB as the accumulator source for the operation to be performed. The 41st bit in the accumulator is used for overflow detection at the time of format adjustment. Some instructions involve no source accumulator, but only load a result into the A and/or B accumulator as selected with their respective enable inputs.

Round MS and Round LS (RMS, RLS)
The Round instructions add a one to the selected source accumulator to provide a rounded result when lower order bits will be truncated upon output. The round instructions operate in parallel with all other instructions. The Round MS instruction is used when only the WMS portion of the result will be output. The Round LS instruction is used when only WMS and WLS are output. The bit position of the addition of one is determined by the format adjust control at the time of the rounding operation.

X Operand Register (XA/B)    (XA|B)
Selects the X operand from the XA register (XA/B = 0) or the XB register (XA/B = 1)

X Operand Mode (XM)
Determines unsigned (XM = 0) or two's complement (XM = 1) mode of the X operand.

Y Operand Register (YA/B)    (YA|B)
Selects the Y operand from the YA register (YA/B = 0) or the YB register (YB/A = 1).

Y Operand Mode (YM)
Determines unsigned (YM = 0) or two's complement (YM = 1) mode of the Y operand.

Format Adjust Control FA0-5
See Figure 1b.

The FA control performs three related functions: shifting of the Z result contents of a 41-bit accumulator into the 40-bit result W, selecting the location of the rounding point and determining the value of result Z that exceeds what can be represented in the selected output format and that will be flagged as an overflow and if selected, overflow corrected.

The shifting of the stored Z result is arithmetic with truncation of higher order bits above 40 and lower order zero insertion. Shifting is to the left from zero to nine positions.

The format adjustment determines which portion of the Z result are in WMS and WLS. Therefore it determines where the addition of a one occurs for rounding of the WMS or WMS and WLS results.

The NEG status flag replicates the higher order bit after format adjustment in WMS of the W result if the output mode is signed (FA4 = 1), otherwise it is always zero. This is the true sign bit if the result has not overflowed or has overflowed and been corrected.

If result Z is a two's complement signed number, the output mode is signed (FA4 = 1), and any truncated bits are different from the sign bit in WMS then a signed overflow has occurred and the OVFL status flag is set. If overflow correction (saturation) has been enabled (FA5 = 1) then the following hex values are substituted in the result W:

|         | WMS  | WLS  | WX |
|---------|------|------|-----|
| NEG = 0 | 7FFF | FFFF | FF  |
| NEG = 1 | 8000 | 0000 | 00  |

If the result Z is an unsigned number and FA4 = 0 and any truncated bits are different from the 41st bit, then an unsigned overflow has occurred and the OVFL status flag is set. If overflow correction (saturation) has been enabled (FA5 = 1) then the following hex values are substituted in the result W:

|              | WMS  | WLS  | WX |
|--------------|------|------|-----|
| 41st bit = 0 | FFFF | FFFF | FF  |
| 41st bit = 1 | 0000 | 0000 | 00  |

The contents of the accumulator are unaltered. If overflow correction is not enabled the truncated result W is output.

Output Multiplexer Control TSEL0-2
See Figure 1c.

The most significant 16-bit portion of the T output port (TMS) can be used to output the three portions of a format adjusted result W from the ZA or ZB accumulator or to output the status flags.

Table 4 (Con't)

Recommended Operating and Test Conditions

| Parameter | Symbol | Value | | | Units |
|---|---|---|---|---|---|
| | | Min | Nom | Max | |
| Supply Voltage ($V_{cc} = 0$) | $V_{ee}$ | −5.46 | −5.20 | −4.94 | $V_{dc}$ |
| Ambient Temperature | $T_a$ | 0 | | 70 | °C |
| Output Termination to −2.0$V_{dc}$ | $R_1$ | | 50 | | Ohms |
| Input Setup Time | $t_s$ | 3.0 | | | ns |
| Input Hold Time | $t_h$ | 3.0 | | | ns |
| Enable Setup Time | $t_{es}$ | 3.0 | | | ns |
| Enable Hold Time | $t_{eh}$ | 3.0 | | | ns |
| Clock and Latch Enable Pulse Duration | $t_c$ | 1.5 | | | ns |

| Parameter | Symbol | Value | | | | | | Units |
|---|---|---|---|---|---|---|---|---|
| | | 0°C | | 25°C | | 70°C | | |
| | | Min | Max | Min | Max | Min | Max | |
| Input Voltage High | $V_{ih}$ | −1.17 | | −1.13 | | −1.07 | | $V_{dc}$ |
| Input Voltage Low | $V_{il}$ | | −1.48 | | −1.48 | | −1.45 | $V_{dc}$ |

Electrical Characteristics

| Parameter | Symbol | Value | | | | | | Units |
|---|---|---|---|---|---|---|---|---|
| | | 0°C | | 25°C | | 70°C | | |
| | | Min | Max | Min | Max | Min | Max | |
| Output Voltage High (Terminated) | $V_{oh}$ | −1.02 | | −0.98 | | −0.92 | | $V_{dc}$ |
| Output Voltage Low (Terminated) | $V_{ol}$ | | −1.63 | | −1.63 | | −1.60 | $V_{dc}$ |

| Parameter | Symbol | Value | | | Units |
|---|---|---|---|---|---|
| | | Min | Nom | Max | |
| Supply Current ($V_{ee}$ = Min) | $I_{ee}$ | | −1050 | | $mA_{dc}$ |
| Input Current High ($V_{ih}$ = Max) | $I_{ih}$ | | | 300 | $\mu A_{dc}$ |
| Multiply Hold Time | $t_{mh}$ | −2.0 | | | ns |
| Clocked Multiply Hold Time | $t_{cmh}$ | −2.0 | | | ns |
| Multiply Accumulate Time | $t_{ma}$ | | 11.0 | | ns |
| Clocked Multiply Accumulate Time | $t_{mac}$ | | 11.0 | | ns |
| Output Delay | $t_{od}$ | | 5.0 | | ns |
| Instruction to Output Delay | $t_{iod}$ | | 6.0 | | ns |
| Clocked Instruction to Output Delay | $t_{ciod}$ | | 5.0 | | ns |
| Output Disable Delay | $t_{dso}$ | | 4.0 | | ns |
| Output Enable Delay | $t_{eno}$ | | 4.0 | | ns |

Table 5

Recommended Operating and Test Conditions

| Parameter | Symbol | Value Min | Value Nom | Value Max | Units |
|---|---|---|---|---|---|
| Supply Voltage (GND = 0) | $V_{cc}$ | 4.75 | 5.00 | 5.25 | $V_{dc}$ |
| Ambient Temperature | $T_a$ | 0 | | 70 | C |
| Input Voltage High | $V_{ih}$ | 2.0 | | | $V_{dc}$ |
| Input Voltage Low | $V_{il}$ | | | 0.8 | $V_{dc}$ |
| Output Current High | $I_{oh}$ | | | -400 | $\mu A_{dc}$ |
| Output Current Low | $I_{ol}$ | | | 4.0 | $mA_{dc}$ |
| Input Setup Time | $t_s$ | 1.5 | | | ns |
| Input Hold Time | $t_h$ | 1.5 | | | ns |
| Enable Setup Time | $t_{es}$ | 1.5 | | | ns |
| Enable Hold Time | $t_{eh}$ | 1.5 | | | ns |
| Clock and Latch Enable Pulse Duration | $t_c$ | 4.5 | | | ns |

Electrical Characteristics

| Parameter | Symbol | Value Min | Value Nom | Value Max | Units |
|---|---|---|---|---|---|
| Supply Current ($V_{cc}$ = Max) | $I_{cc}$ | | 900 | | $mA_{dc}$ |
| Input Current High ($V_{cc}$ = Max, $V_{ih}$ = 2.4) | $I_{ih}$ | | | 200 | $\mu A_{dc}$ |
| Input Current Low ($V_{cc}$ = Max, $V_{il}$ = 0.4) | $I_{il}$ | | | -0.2 | $mA_{dc}$ |
| Output Voltage High ($V_{cc}$ = Min, $V_{oh}$ = Max) | $V_{oh}$ | 2.4 | | | $V_{dc}$ |
| Output Voltage Low ($V_{cc}$ = Min, $I_{ol}$ = Max) | $V_{ol}$ | | | 0.4 | $V_{dc}$ |
| High Impedance Output Current ($V_{cc}$ = Max, $V_o$ = 2.4) | $I_{ozh}$ | | | 40 | $\mu A_{dc}$ |
| High Impedance Output Current ($V_{cc}$ = Max, $V_o$ = 0.4) | $I_{ozl}$ | | | -40 | $\mu A_{dc}$ |
| Multiply Hold Time | $t_{mh}$ | -2.0 | | | ns |
| Clocked Multiply Hold Time | $t_{cmh}$ | -2.0 | | | ns |
| Multiply Accumulate Time | $t_{ma}$ | | 11.0 | | ns |
| Clocked Multiply Accumulated Time | $t_{mac}$ | | 11.0 | | ns |
| Output Delay | $t_{od}$ | | 10.0 | | ns |
| Instruction to Output Delay | $t_{iod}$ | | 10.0 | | ns |
| Clocked Instruction to Output Delay | $t_{ciod}$ | | 10.0 | | ns |
| Output Disable Time H→Z | $t_{phz}$ | | 10.0 | | ns |
| L→Z | $t_{plz}$ | | 10.0 | | ns |
| Output Enable Time Z→H | $t_{pzh}$ | | 10.0 | | ns |
| Z→L | $t_{pzl}$ | | 10.0 | | ns |

*$V_{cc}$ = 5.0 Volts, $T_a$ = 25 C

Table 6